United States Patent [19]

Fujino

[11] Patent Number: 5,701,530
[45] Date of Patent: Dec. 23, 1997

[54] INFORMATION RECORDING SYSTEM

[75] Inventor: Takeshi Fujino, Yokohama, Japan

[73] Assignee: Nikon Corporation, Tokyo, Japan

[21] Appl. No.: 457,746

[22] Filed: Jun. 1, 1995

Related U.S. Application Data

[63] Continuation of Ser. No. 335,972, Nov. 3, 1994, abandoned, which is a continuation of Ser. No. 173,944, Dec. 27, 1993, abandoned, which is a continuation of Ser. No. 17,342, Feb. 3, 1993, abandoned, which is a continuation of Ser. No. 773,790, Oct. 11, 1991, abandoned, which is a continuation of Ser. No. 485,761, Feb. 26, 1990, abandoned, which is a continuation of Ser. No. 343,332, Apr. 26, 1989, abandoned.

[30]     Foreign Application Priority Data

| May 2, 1988 | [JP] | Japan | 63-107634 |
| May 2, 1988 | [JP] | Japan | 63-107635 |
| May 6, 1988 | [JP] | Japan | 63-109159 |

[51] Int. Cl.⁶ .................................................. G03B 17/24
[52] U.S. Cl. ........................................ 396/311; 396/321
[58] Field of Search ............................ 354/21, 75, 105, 354/106, 275; 396/297, 299, 300, 310, 311, 321, 512

[56]         References Cited

U.S. PATENT DOCUMENTS

| 4,500,183 | 2/1985 | Tenikawa | 354/21 |
| 4,678,299 | 7/1987 | Harvey | 354/21 |
| 4,814,802 | 3/1989 | Ogawa | 354/105 |
| 4,960,994 | 10/1990 | Muller et al. | 250/327 |

FOREIGN PATENT DOCUMENTS

| 0 039 492 | 11/1981 | European Pat. Off. . |
| 0 236 960 | 9/1987 | European Pat. Off. . |
| 0 307 760 | 3/1989 | European Pat. Off. . |

*Primary Examiner*—Howard B. Blankenship
*Attorney, Agent, or Firm*—Shapiro and Shapiro

[57]            ABSTRACT

A film cartridge is provided with a memory in which information is written manually and/or automatically. When the film cartridge is loaded in a camera, information in the memory may be read and used to control photographic processes in the camera. Certain information may be written in the memory in association with the exposure of each frame of the film. Information may also be written on the film itself. Information stored in the memory may also be used to control processing of exposed film in a photographic laboratory.

42 Claims, 16 Drawing Sheets

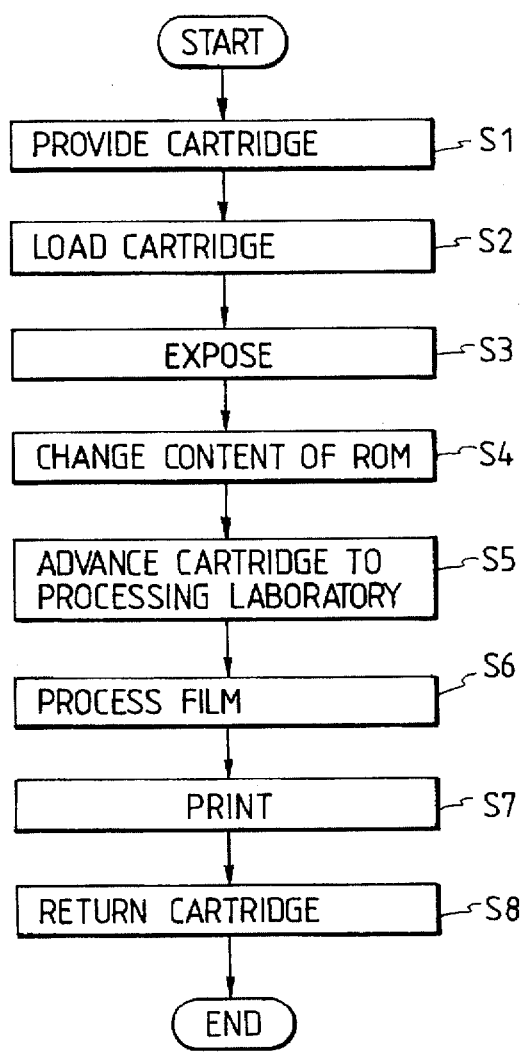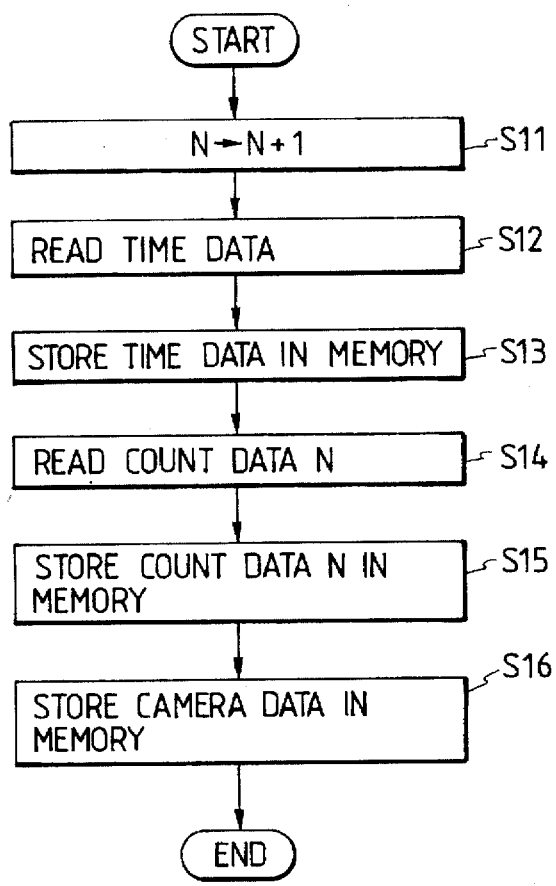

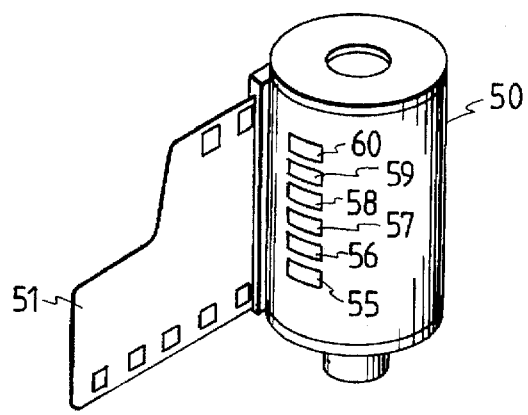
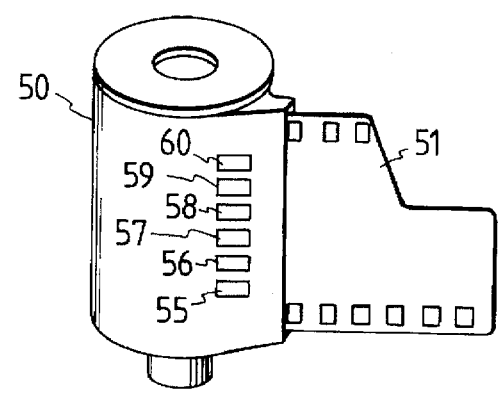
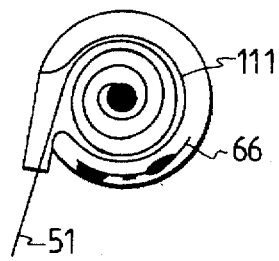
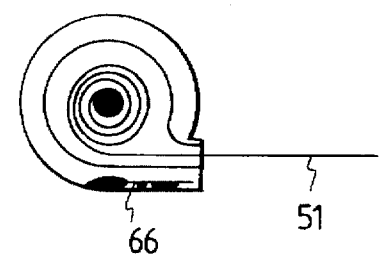
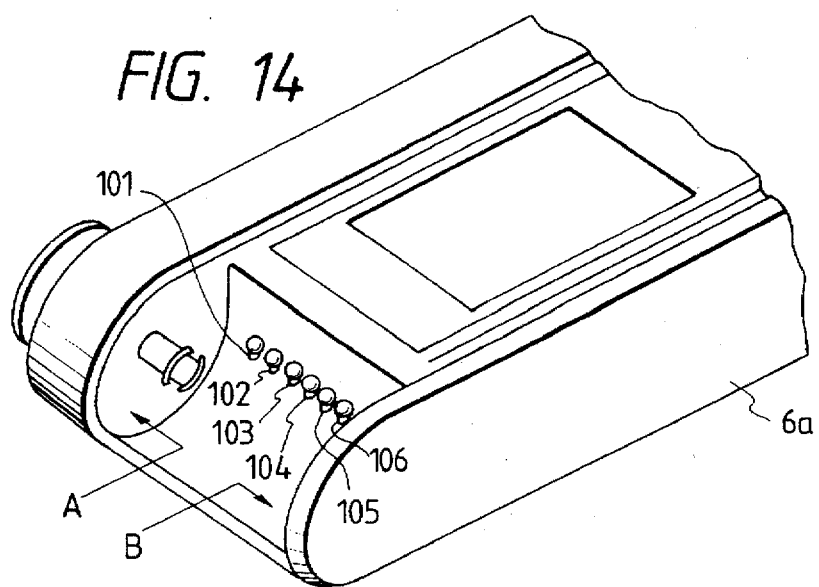

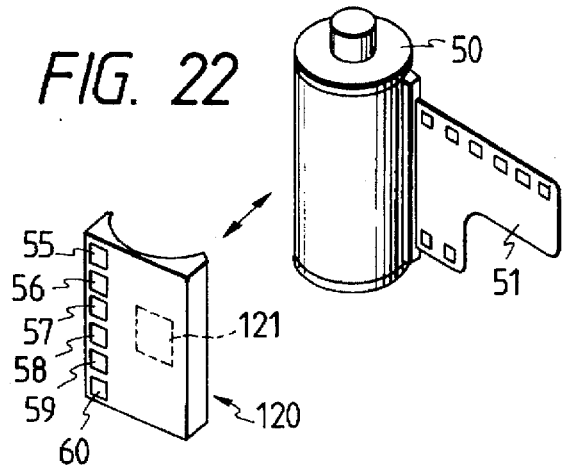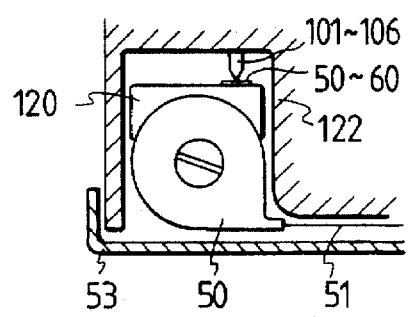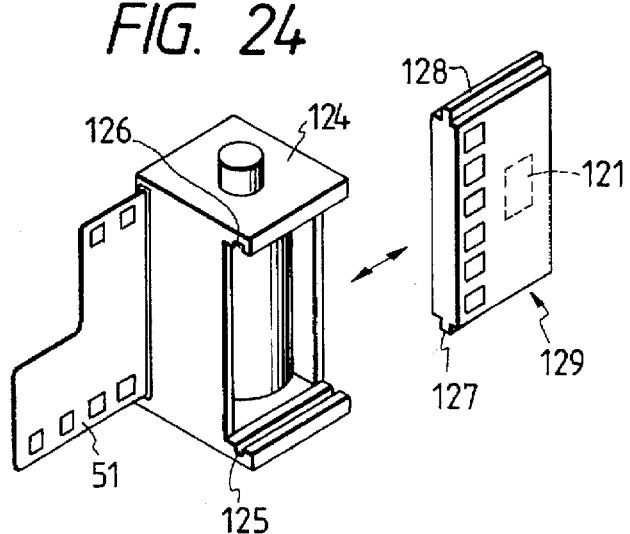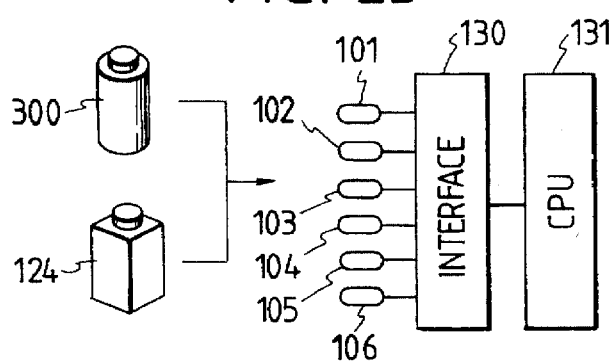

INFORMATION RECORDING SYSTEM

This is a continuation of application Ser. No. 08/335,972 filed Nov. 3, 1994, which is a continuation of application Ser. No. 08/173,944 filed Dec. 27, 1993, which is a continuation of application Ser. No. 08/017,342 filed Feb. 3, 1993, which is a continuation of application Ser. No. 07/773,790 filed Oct. 11, 1991, which is a continuation of application Ser. No. 07/485,761 filed Feb. 26, 1990, which is a continuation of application Ser. No. 07/343,332 filed Apr. 26, 1989, all abandoned.

BACKGROUND OF THE INVENTION

1. Field of the Invention

The present invention relates to an information recording system used for microscopes.

2. Related Background Art

Microscope recording systems attached to microscopes for taking photographs of images in the microscopes are known in the past. In the case of microscope image photography, a variety of data are needed at the time of performing an evaluation of the contents of a microscope film which is to be obtained later after development. For example, the necessary data may be exemplified by: the magnification of the ocular lens, and of the objective lens, the light source of the microscope, the identification No. of the specimen, whether or not the specimen has been dyed, the type of stain used at the time of photography, and the time taken from the start of the subject experiment. Hitherto, users needed to take a note or other record of the above-described data as to be used as information later. There have been microscope image recording devices of the type adapted to record such information by automatically recording the relevant data at predetermined positions on the film to be used in photography.

In the above-described prior art, in which users need to take a note whenever photography is performed, the users are required to perform such a complicated task. Furthermore, since the notes taken and the films are separate, the way in which they correspond can be easily forgotten. In addition, there is a risk that such notes may be lost.

In a conventional microscope image recording device adapted to allow data to be recorded on a film, there is a possibility that the film cannot be used if the position at which the data is recorded is the important portion that needs to be observed during evaluation. In addition, if the types of data become too numerous, a great number of unnecessary data items will be recorded on the film print, or the relationship between the numerals and data may easily be forgotten.

SUMMARY OF THE INVENTION

An object of the present invention is to provide an information recording system capable of recording information in which users can readily control both the photography and the information without involving any necessity to write the data on the photographic print. A further object of the present invention is to provide an improved laboratory processing system in which such information is used.

In order to ovecome the above-described problems and according to the present invention, a film cartridge provided with a ROM for reading and writing information is employed as a recording device, information being written on the ROM provided with the film or the film cartridge. In addition, the information written by the recording device is arranged to be stored in the ROM together with the film during the development and enlarging processes with other information being added thereto or processed.

Accordingly, since the ROM is always maintained with the film or the film cartridge throughout the process starting from the time of photography through to the development of the negative, and information relating to the photography is stored in the ROM on the film or the film cartridge, the risk of forgetting the relationship between the information and the negative can be eliminated. In addition, since the information input at the time of the photography can be permanently stored, the complicated task of controlling the information and arrangement of the negatives can be eliminated.

BRIEF DESCRIPTION OF THE DRAWINGS

FIG. 1A is a flow chart which schematically illustrates the present invention;

FIGS. 1B, 1C and 1D are flow charts each of which illustrates a portion of the steps shown in FIG. 1A;

FIGS. 13A and 13B are views which illustrate the structure of a first embodiment of a cartridge according to the present invention;

FIG. 14 is a view which illustrates a portion of the structure of a camera according to the first embodiment of the cartridge;

FIGS. 15A and 15B are views which illustrate the structure of a second embodiment of the cartridge according to the present invention;

FIG. 22 is a view which illustrates the structure of a fifth embodiment of the cartridge according to the present invention;

FIG. 23 is a view which illustrates a portion of the structure of the camera according to the fifth embodiment of the cartridge according to the present invention;

FIG. 24 is a view which illustrates the structure of a sixth embodiment of the cartridge according to the present invention;

FIG. 25 is a block diagram which illustrates a portion of the camera according to the sixth embodiment of the cartridge;

DESCRIPTION OF THE PREFERRED EMBODIMENTS

Figure 2:
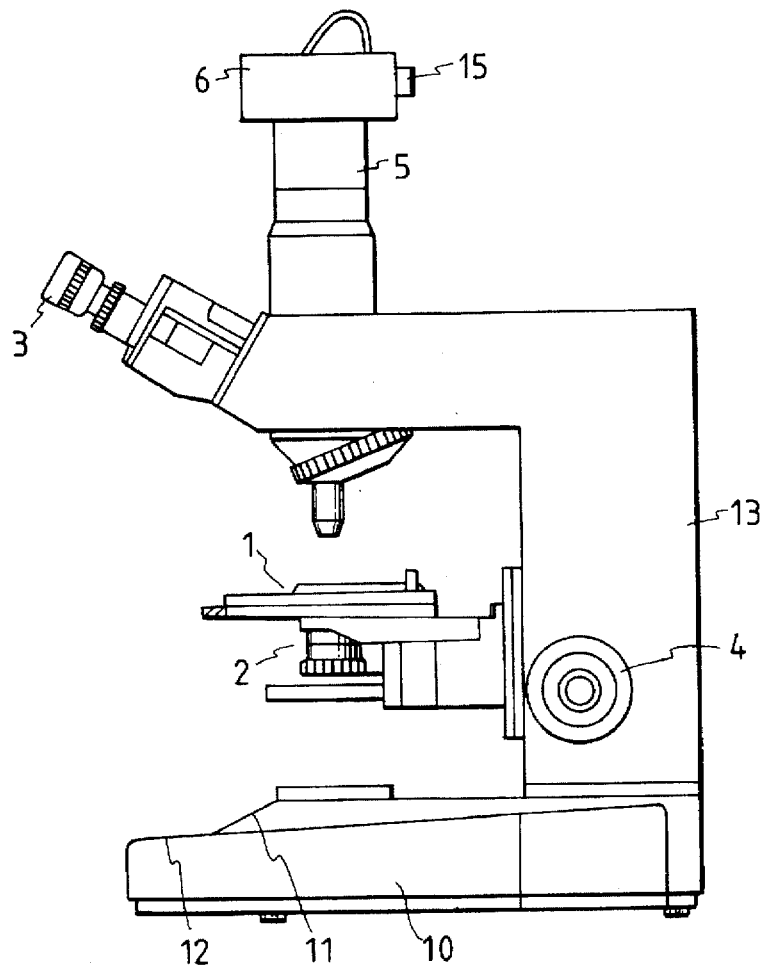
FIG. 2 is a view which illustrates the exterior of a microscope according to the present invention.
Figure 4A:
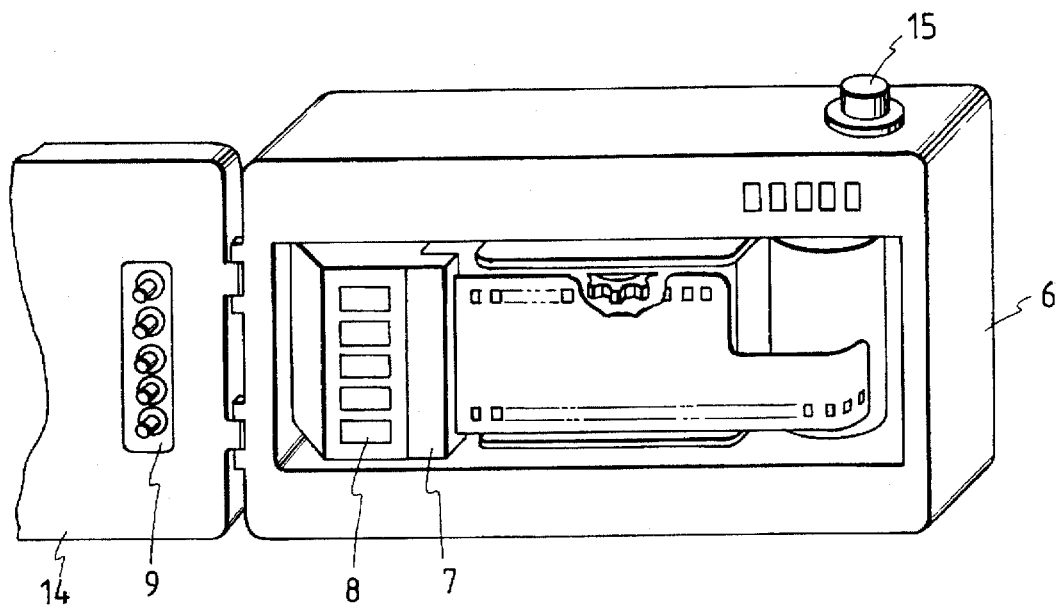
FIG. 4A is a view which illustrates the exterior of a camera mounted on the microscope shown in FIG. 2.

FIG. 2 is a schematic view of a recording system used for a microscope according to the present invention. Reference numeral 1 represents a table on which a specimen is placed, 2 a light source, 3 an ocular lens, 4 a dial for focusing, 5 a photographic lens, and 6 a photographic device (camera). The user performs focusing by adjusting the dial 4 while observing the image through the ocular lens 3. FIG. 4 is a top plan view which illustrates the state with the rear cover of the photographic device 6 open. Reference numeral 7 represents a film cartridge in which a normal silver salt film is accommodated. The film cartridge 7 further accommodates a ROM. This ROM is a ROM capable of writing and reading information. The input and output from the ROM is performed through 5 terminals 8 provided on the surface of the film cartridge 7. A rear cover 14 of the photographic device 6 is provided with 5 terminals 9 on the inner surface thereof, the 5 terminals 9 being provided for inputting and outputting information. Thus, information can be input or output as a result of the connection established with the 5 terminals 8 on the film cartridge 7 when the rear cover 14 is closed.

FIG. 1A illustrates the process of taking photographs using the recording device according to the present invention. The process of taking a photograph will be described with reference to the flow shown in FIG. 1A.

In step S1, the user obtains an unused film cartridge 7. Although this film cartridge 7 is unused, specific information about the film has been written in the ROM provided thereon. Typical items of information may be exemplified by the ISO sensitivity of the film, the number of frames in the film, and data to identify whether the film is color or black and white.

In step S2, the user places the film cartridge 7 in the photographic device 6. When the rear cover 14 is closed, photography is enabled and the terminals 8 on the film cartridge 7 and the terminals 9 in the photographic device 6 are brought into contact with each other. This enables the input and output of information. At this time, the photographic device 6 reads information such as the ISO sensitivity from the film cartridge 7. The thus-read information is used in controlling the photography performed by the photographic device 6. For example, the information about the ISO sensitivity is used for determining exposure values at the time of taking a photograph.

When a film is loaded, writing of information is also performed, in addition to reading of the same. The information input at this time is information relating to the photographic device 6, this information influencing the later processes to which the film is to be subjected or being information that is required to remain on the film. Specific examples of such information are as follows: whether or not the photographic device is a half-size device, whether or not the photography to be conducted is a sensitized photography, whether or not the system is the prewinding type, the identification No. of the photographic device 6, the date of loading the film, and the serial No. of the cartridge (which corresponds to the sequential order of all cartridges loaded in the photographic device 6). The assignee of the present invention previously submitted an application relating to the above-described technology (U.S. Pat. No. 4,814,802, which issued on Mar. 21, 1989, from Ser. No. 221,017, filed on Jul. 18, 1988, which is a continuation of U.S. Ser. No. 33,725, filed on Apr. 3, 1987), now abandoned.

Figure 4B:
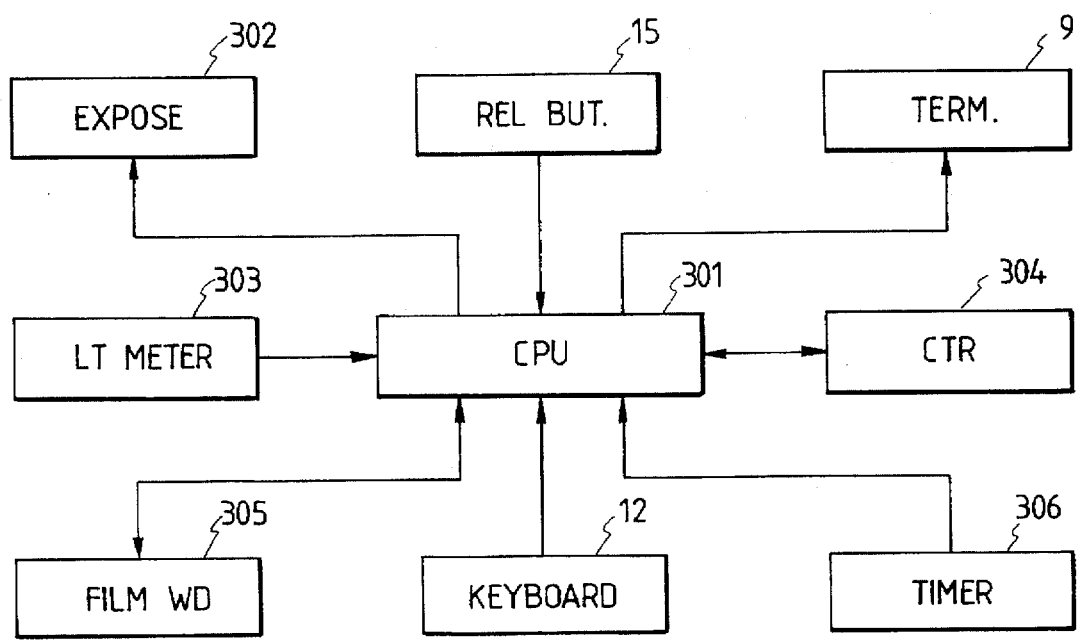
FIG. 4B is a block diagram which illustrates the structure of the camera shown in FIG. 4A.

FIG. 1B illustrates the operation of a CPU 301 (see FIG. 4B) of the photographic device 6 in accordance with the flow of step S2. The fact that the cartridge 7 has been loaded in the photographic device 6 is detected by known technology such as a switch. As a result of this detection, the operation shown in FIG. 1B starts. FIG. 4B is a block diagram which shows a portion of the structure of the photographic device 6.

Referring to FIG. 1B, the contents N of the counter 304 is incremented by 1 in accordance with the loading of the cartridge 7 in step S11. This contents N of the counter 304 corresponds to the above-described applications. In step S12, time data which follows the date shown by the timer 306 is read, and the thus-read data is stored in the ROM of the cartridge 7 via the terminals in step S13. In step S14, the contents N of the counter 304 is read, and in step S15 the thus-read data N is stored in the ROM of the cartridge 7 via the terminals 9. In step S16, data such as the above-described date of loading the film, and the camera data such as the identification No. of the camera except for the serial number of the cartridge are stored in the ROM via the terminals 9.

Figure 3:
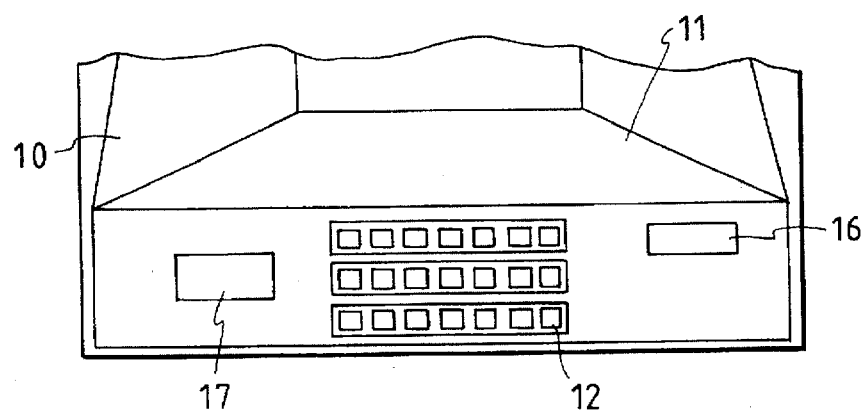
FIG. 3 is a view which illustrates a portion of the microscope shown in FIG. 2.

In step S3, the user turns the dial 4 with the image observed through the ocular lens 3 for the purpose of obtaining a further focused image, and takes a photograph by using the photographic device 6 after required information has been input into the photographic device 6. FIG. 3 is an enlarged view of the bottom portion of the recording device for the microscope of FIG. 2 (the same reference numerals represent the same components). Reference numeral 12 represents a keyboard for inputting information. The information inputted from the keyboard 12 is transmitted to the photographic device 6 via a cable line in the members 10 and 13. The information transmitted to the photographic device 6 is written in the ROM in the film cartridge 7 via the five terminals 9 disposed on the rear cover 14 and the five terminals 8 on the film cartridge 7. Then, the user operates a shutter release member 15 of the photographic device 6, causing the image similar to the image which is being observed through the ocular lens 3 to be photographed by the photographic device 6.

Figure 1C:
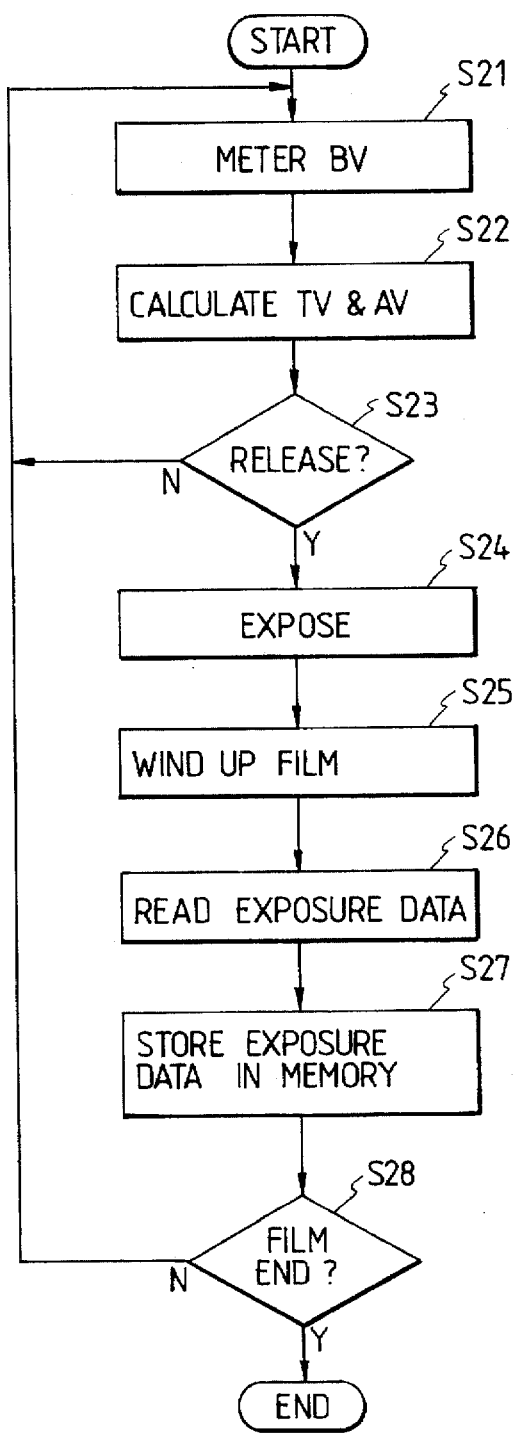
Figure 1D:
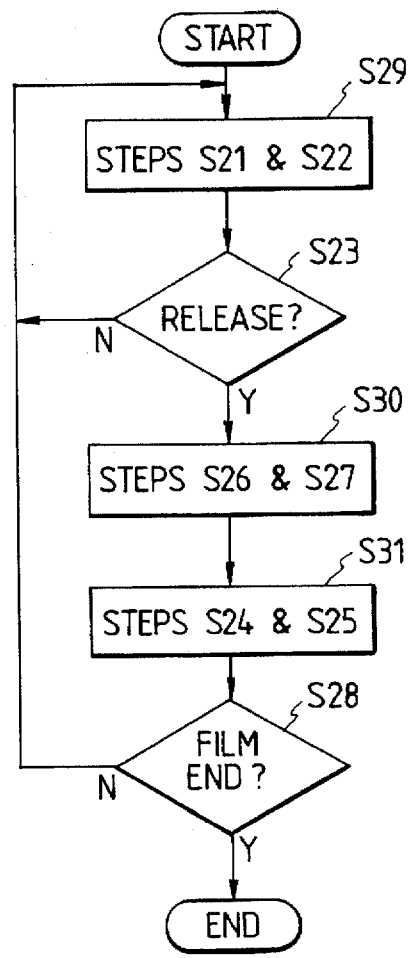

The information input through the keyboard may be written in the ROM for every frame in synchronization with the exposure for each frame of the film or the winding of each frame of the film. The operation corresponding to this description is shown in FIGS. 1C and 1D. The device according to the present invention acts in accordance with either the flow chart shown in FIG. 1C or that shown in FIG. 1D.

When the release button 15 is pushed by a half depression, either the flow chart shown in FIG. 1C or that shown in FIG. 1D starts. In step S21 shown in FIG. 1A, the CPU 301 measures the subject brightness BV on the basis of the output from a photometer 303. In step S22, the shutter speed TV and the diaphragm AV are calculated. In step S23, it is determined whether or not the release button 15 has been completely pushed. If it is determined that the release button 15 has been completely pushed, the film is exposed to light in step S24 on the basis of the shutter speed TV and the diaphragm AV calculated in step S22. In step S25, one frame of the film is wound. In step S26, exposure data is read, the exposure data being the shutter speed TV and the diaphragm AV calculated in step S22, the magnification of the objective lens to be described later, data about the trimming performed at the time of printing, the number of prints, and the size of the prints. In step S27, the thus-read exposure data is stored in the ROM of the cartridge 7 via the terminals 9.

The flow shown in FIG. 1D differs from the flow shown in FIG. 1C in the fact that steps S26 and S27 are positioned in front of the steps S24 and S25.

As a result of the above-described operation, the user can retain the information, which corresponds to the image on one frame photographed on the film, in the ROM included in the film cartridge 7. Since the information is written inside the cartridge 7, the risk of losing of it can be eliminated. It, of course, is necessary for the structure to be arranged in such a manner that the correspondence between one inputting of information and one frame of the film can be retained by making releasing of the release member 15 impossible if a user operates the release member 15 without any operation of the keyboard 12 and also alerting the user to the fact that the inputting of the information has not been performed, and by outputting an alarm to be displayed on a display element 16 if a user operates the keyboard 12 again before operating the release member 15. Furthermore, the keyboard 12 includes a key having a correction function so that if an error is detected in the information which has been input, the inputting operation can be tried again by pushing the correction key. The information which has been input is retained to be displayed on a display element 17 formed by a liquid crystal display or the like upon the completion of the photography so that the input information can be confirmed with reference to this display.

It might be desirable to write in the ROM for every frame the information which involves a possibility of change for every frame. Specifically, such information may be exemplified by: the magnification of the objective lens and the ocular (photographic) lens, the name and the identification No. of the specimen, the type of treatment such as dyeing and/or cutting performed for the purpose of preparing the specimen, the type of the light source of the microscope, temperature, humidity, the time taken from the start of the experiment, and date. In addition, commands whether or not trimming is to be performed, and commands the number and the size of the photographic prints are exemplified. The structure may be arranged such that the data which can be automatically measured by the recording device, such as date, temperature, humidity and time is transmitted to the ROM in the cartridge 7 by selecting an automatic mode when the photography is performed. Furthermore, tasks required of a user can be further eliminated by arranging the structure such that the inputting of information required to be manually input can be completed simply by displaying the information about the previous frame of the film and by inputting the changed information only.

When exposure of the film is completed, the user takes out the film cartridge 7 from the photographic device 6. The film may then be transmitted to a processing laboratory. However, according to the present invention, the film is subjected to a process performed by an information-converter disposed in the ROM so that the contents of the ROM are confirmed, changed, and/or added to. These processes correspond to step S4.

Figure 5:
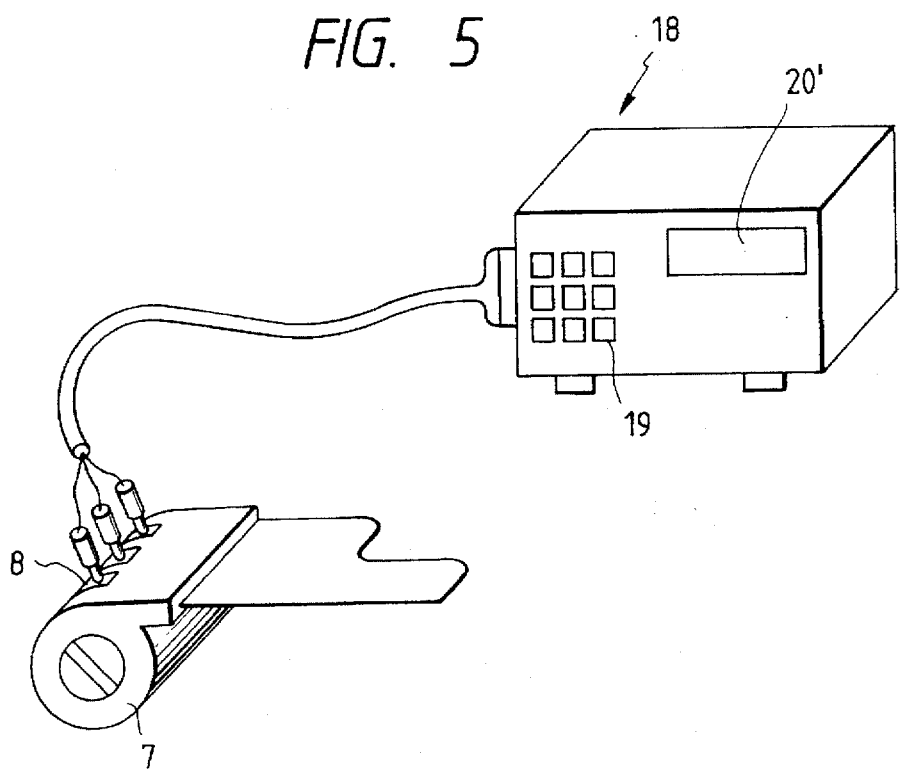
FIG. 5 is a view which illustrates a portion of the devices according to the present invention.

FIG. 5 illustrates an embodiment of an information converter included in the ROM.

A converter 18 is connected to the terminals 8 on the film cartridge 7. Only three terminals are illustrated in this drawing. The converter 18 includes a keyboard 19 and a display portion 20' on the surface thereof. The information stored in the ROM is arranged to be displayed on the display portion 20' when the keyboard 19 is operated. On the basis of the contents of the display, the contents of the ROM can be confirmed and desired information can be modified by operating the ROM. For example, the number of the prints which has been input for every frame at the time of the photography, the size of the print, and whether or not trimming is to be conducted can be modified. In addition, information about the processes to be applied to the film can be added and/or modified. For example, the output state of the completed prints can be instructed, indicating, for example, the size and/or the number of the prints for certain frames.

The film cartridge 7, which has been subjected to the information-confirmation, addition, and modifications processes in step S4, is submitted to the processing laboratory in step S5. Steps S6 and S7 correspond to the processes to be performed in the processing laboratory. In S6, the film cartridge 7 which has been submitted to the processing laboratory is subjected to a film-development process. It is assumed that a multiplicity of film cartridges have been gathered together with the film cartridge 7 which has been photographed by the user of the device according to the present invention. The thus-gathered film cartridges are each subjected to the information converter 18 in the ROM shown in FIG. 5 so that the film processing conditions are read out. That is, they are exemplified by: whether or not the subject film is color or white and black, whether or not the picture size is the half-size, whether or not the sensitized-development needs to be performed, or whether or not the special print is instructed. The processing laboratory determines the most suitable developing conditions, it writes the time taken to complete the development, the temperature of the developer, the way of development performed by the developer in the ROM, and it classifies the films on the basis of the types of the processes performed. Then, the actual development is performed. The processes to be performed in the processing laboratory can, of course, be conducted if there is a multiplicity of the film cartridges to be processed in the same manner. Therefore, a significant advantage can be obtained in the efficiency of the development by the capability of classifying the types of the processes prior to conducting the development. Although the information contained originally in the film cartridge can be visually confirmed at the processing laboratory since the same is printed on the surface of the cartridge, the information added by the user after the photography (information such as that the film size is half-size, or sensitized development needs to be performed) cannot be confirmed. Hitherto, such requests of processing have been identified by confirming the note attached by users when the cartridge is submitted to the processing laboratory. There is a fear that the correspondence between the note and the film cartridge may be lost during the processing performed at the laboratory, causing a risk of conducting different processing. However, according to the present invention, the above-described risk of conducting the different processing can be prevented since the film cartridge and the information are always combined with each other by writing the information in the ROM.

Figure 6A:
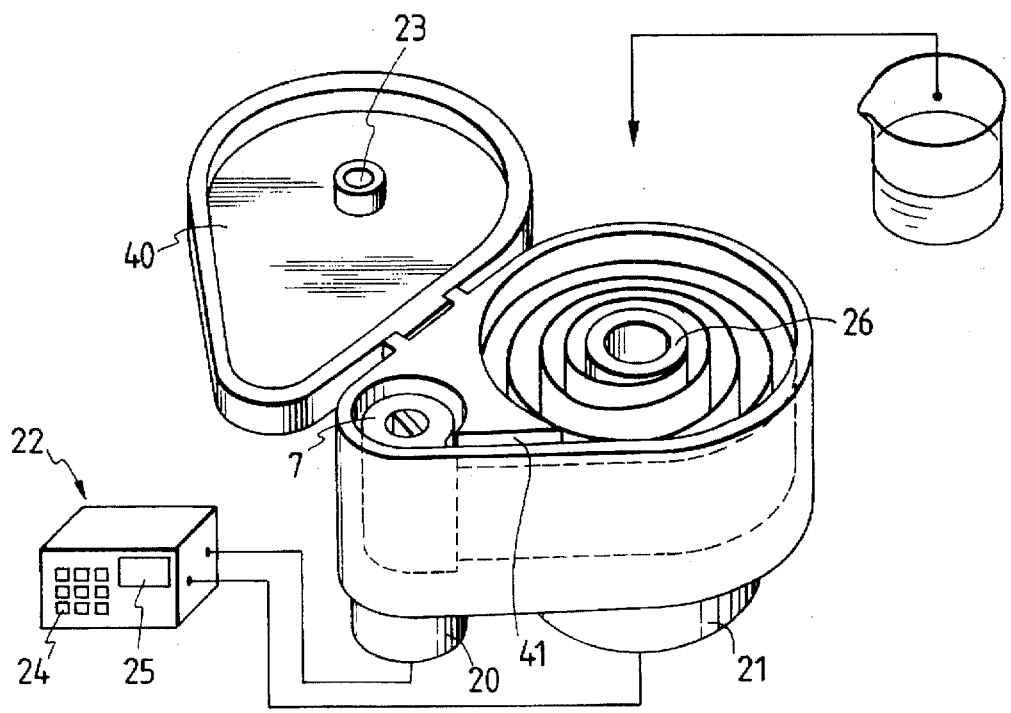
FIGS. 6A, 6B, and 6C are views each of which illustrates a portion of the devices according to the present invention.
Figure 6B:
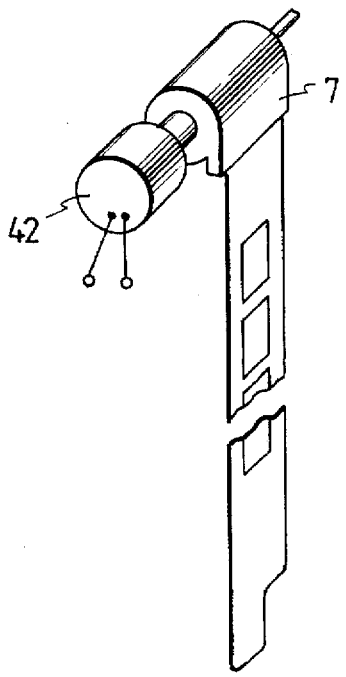
Figure 6C:
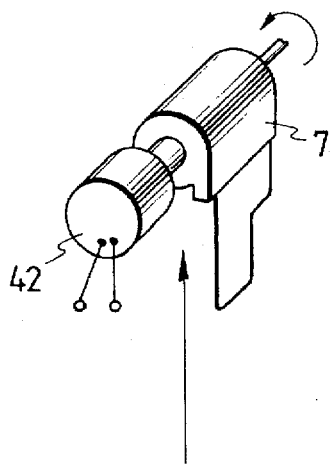

FIG. 6A is a view which illustrates a first embodiment of the film developing device according to the present invention. Reference numeral 20 represents a film cartridge case for accommodating the film cartridge 7 which has been subjected to the pretreatments as far as step S4. After the film cartridge 7 has been accommodated, the film cartridge case 20 is shielded from light by a light-shielding cover 40. The inner surface of the case 20 is provided with five terminals at the positions corresponding to the terminals 8 of the film cartridge 7. The information in the ROM in the film cartridge 7 is read through the above-described terminals, and is transmitted to a controller 22. The controller 22 is provided with a keyboard 24 and a display portion 25 on the surface thereof so that the development conditions which have been written in the pretreatment process are displayed on a display portion 25 to be confirmed, and then the development process starts here. The conjunction surface between the case 20 and the developer tank 21 is formed with a slit 41 through which the film is transmitted from the case 20 to the developer tank 21. When the developing starts, the film is transmitted through the slit 41 to the developer tank 21 wherein it is wound on a reel 26. Then, the slit 41 is closed by a member. Then, the developer capable of meeting the conditions which have been confirmed with reference to the display on the display portion 25 is injected through a liquid injection port 23, and is discharged through an outlet port disposed on the bottom surface of the developer tank 21 after the time for development confirmed with reference to the display on the display portion 25 has elapsed. Then, fixing solution is injected through the liquid injection port 23, and is discharged through the outlet port after a predetermined time has elapsed. In addition, washer is injected through the liquid injection port 23, and is discharged through the outlet port after a predetermined time has elapsed. If all of information about the processes to be performed and processing time conditions are written in the ROM of the film cartridge in the pretreatment process, the above-described liquid injection processes and the discharging processes can be automatically conducted by reading the above-described information with the controller 22. After the development process has been completed, the film is taken out from developer tank 21, and is hung with the film cartridge placed upwards for the purpose of being dried (see FIG. 6B). After the film has been dried, the film is again wound inside portion of the cartridge by using a motor 42. Thus, the film development process is completed (see FIG. 6C).

Figure 7:
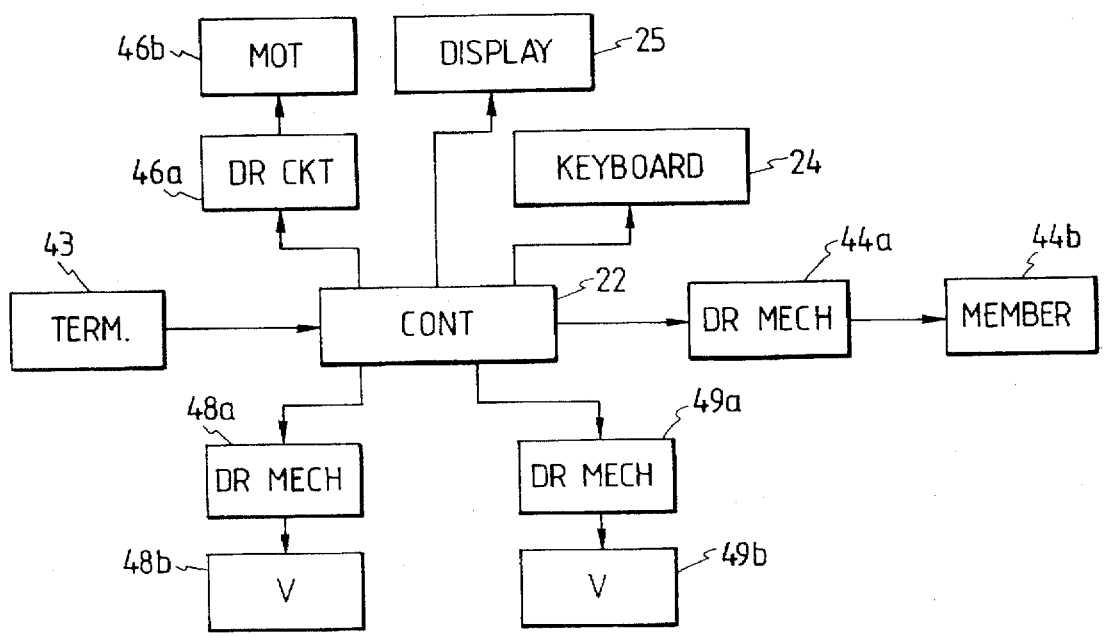
FIG. 7 is a block diagram which illustrates the structure of the devices shown in FIG. 6A.

FIG. 7 is a block diagram which illustrates peripheral equipments of the controller 22 for automatically controlling injection and discharge of the developer. A motor 46b and a drive circuit 46a are provided in the tank 21. A valve 48b is provided in the injection port 23 to control the injection of the developer into the tank 21. A valve 49b is provided in the discharge port of the tank 21 to control the discharge of the developer from the tank 21. A drive mechanism 48a drives the valve 48b, and a drive mechanism 49a drives the valve 49b. A member 44b shields the slit 41, and a drive mechanism 44a drives the member 44b. A terminal means 43 is provided for the case 20' and is arranged to be connected to the terminals 8 of the cartridge 7 accommodated in the case 20. The controller 22 drives the motor 46b, causing the film to be transmitted from the case 20 to the tank 21, reads data from the ROM of the cartridge 7 accommodated in the case 20 via the terminal means 43, and controls the valves 48b and 49b as to make the development time coincide with that instructed by this data.

Figure 8:
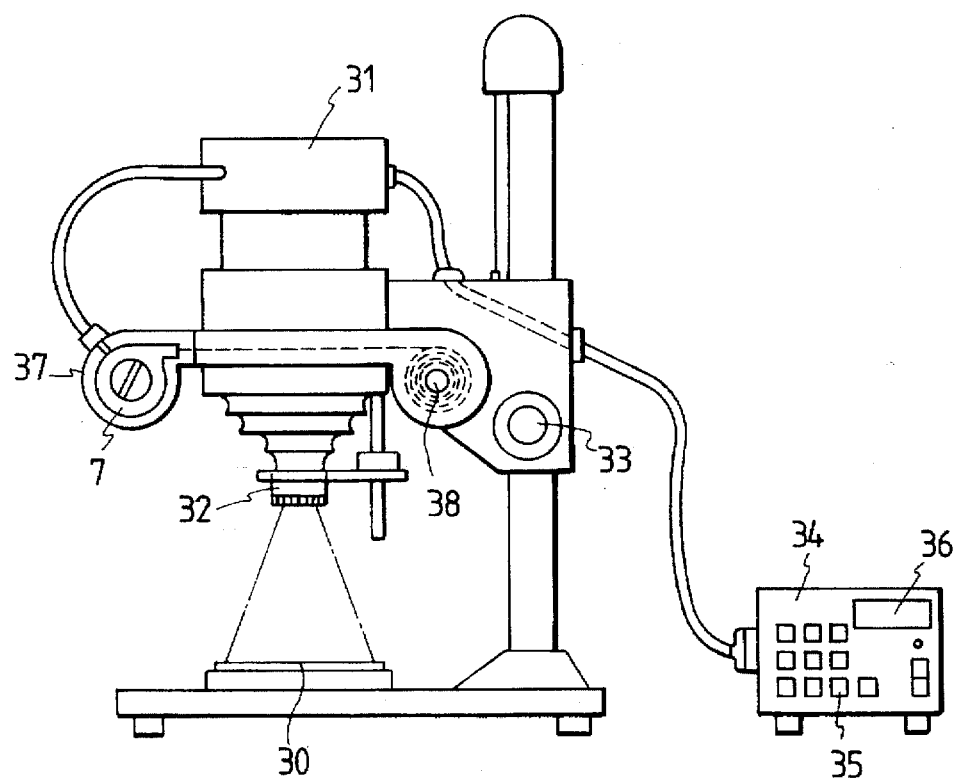
FIG. 8 is a view which illustrates a portion of the device according to the present invention.
Figure 9:
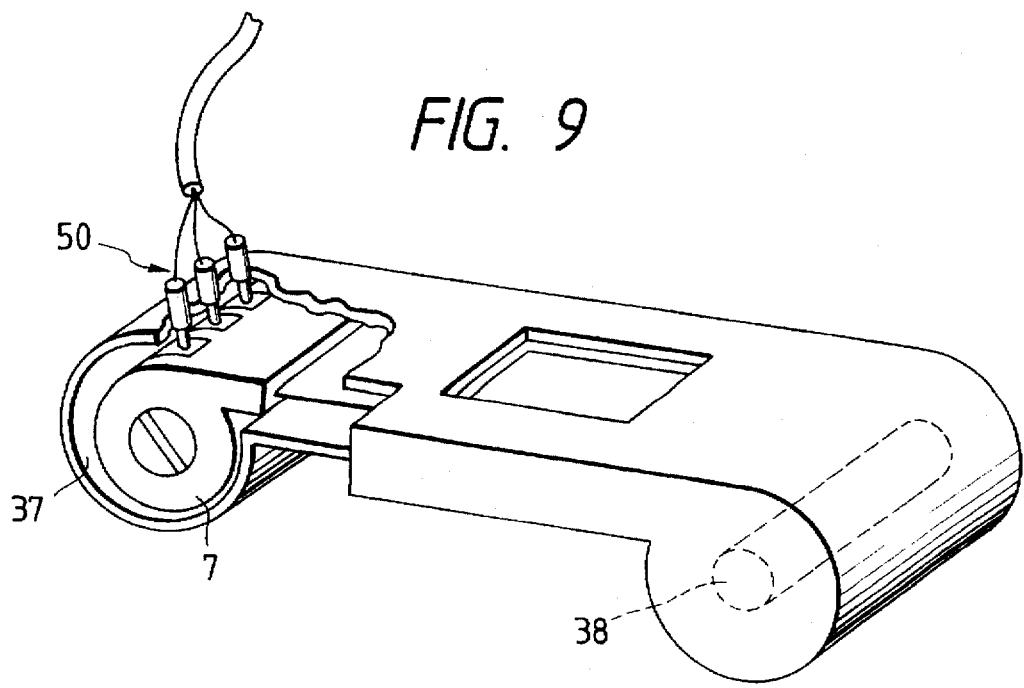
FIG. 9 is a view which illustrates a portion of the device shown in FIG. 8.

Next, the printing process according to step S7 is conducted. FIG. 8 illustrates an example of enlarging device according to the present invention. A photographic paper is disposed at a predetermined position on a member 30, and light beams emitted from a light source 31 are applied to the photographic paper for a predetermined time period. As a result, the image of a negative which has been previously disposed in the enlarger is projected on the photographic paper disposed on the member 30 through a lens 32. Reference numeral 37 is a case for accommodating the negative accommodated in the cartridge 7, and reference numeral 38 represents a shaft for winding the negative which has been drawn out from the cartridge 7. Terminal means 50 for reading contents of the ROM or through which writing is conducted are disposed at the positions confronting the corresponding terminals 8 of the cartridge 7, as shown in FIG. 9, an enlarged view which illustrates the cartridge portion. The above-described components are connected to a controller 34 that reads information in the ROM in the film cartridge via the terminal means 50 so as to display the read-out information on a display portion 36, and, writes information in the ROM by operating a keyboard 35. The size of the print can be determined by changing the distance between the enlarging lens 32 and the member 30 by turning the dial 33.

Now, the operation process of the device according to the present invention will be described. First, the film cartridge 7 which has been developed is loaded in the case 37. Next, the keyboard 35 is operated to read out the information in the ROM in the film cartridge 7 and to transmit the read information to the controller 34. The information to be read out is classified into information for a film pack and information for every frame. The former information might be the number of frames and a special mention about the development process. The latter information might be the enlarging size of the frame, the number of the enlarged prints, whether or not trimming is conducted, and color (density or correction of color balance) instructed by a user. After the information has been read, the tone or the like of the negative is confirmed so to determine the printing conditions. The printing conditions are exemplified by the following: the exposure time, whether or not the color balance correction is performed, the degree of the color density, and the type of the photographic paper to be used and so on. The above-described printing conditions are written in the ROM in the film cartridge 7 by operating the keyboard 35. Then, the photographic paper is exposed to light so that a film print is processed. If a user has instructed in the ROM for specific photography information to be written in the print, the enlarging device executes this instruction. For example, if there is an instruction "write the photographic magnification in the right end portion of the print", the information about the photographic magnification read by the controller may be added to the print simultaneously with performing the exposing. Although the enlarging device is described as a general example of the printing process here, a contact printing device may be used in a manner similar to that described above if the information read prior to development in S6 instructs a contact printing. Other printing devices in which a special processing needs to be performed may also be used in a manner similar to that described above.

As a result of the above-described processes, the user can obtain prints and the negative accommodated in the film cartridge. Since the information about the entire process starting from photography with the recording device for a microscope to the time at which prints are processed in the processing laboratory is stored in the ROM in the film cartridge, this information can be effectively used again when prints are required again. In addition, when the processing laboratory receives a request for printing again, printing under the similar conditions to those of the previous printing can be readily performed.

Although a case in which a ROM is provided in a film cartridge has been described, the invention has other embodiments, as will now be described.

Figure 10:
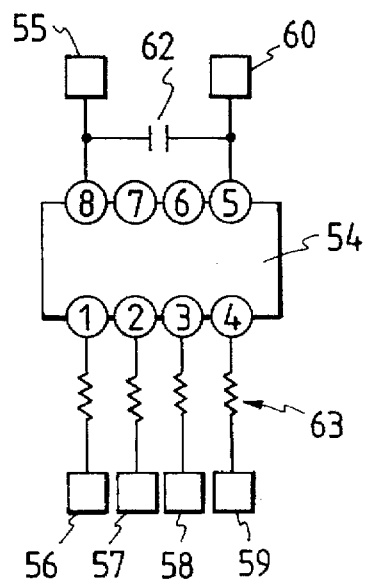
FIGS. 10, 11, 12A, and 12B are views which illustrate the circuits to be provided in the cartridge according to the present invention.

FIG. 10 illustrates a circuit in which an IC for a semiconductor memory (abbreviated to "IC" hereinafter) 54 provided in the film cartridge according to the present invention is assembled with peripheral components.

The IC 54 has eight pins including two unused pins. The information input and output functions of the above-described pins will be described.

A voltage from a power source is applied between terminals 55 and 60, a pin ⑧ is a power source pin, pin ⑤ is a grounding pin, and a capacitor 62 is connected between these pins.

Pins ① to ④ are a clock pin, data input pin, data output pin, and a chip select pin, respectively, and are connected to the corresponding terminals 56 to 59 via a resistors 63. The clock pin ① is a pin to which a reference pulse is input when digital data is transmitted from a circuit (omitted from illustration) to the IC 54, and in synchronization with the thus applied pulse, data is input in series to the data input pin ② or output from the data output pin ③. The chip select pin ④ is a pin for controlling the action of the IC 54, and is a pin which is used when the clock, data input, and data output pins ① to ③ are in parallel connected to another IC (omitted from illustration).

A plurality of Resistors 63 are connected between the pins ① to ④ for the purpose of preventing the influence of static electricity or the like due to the disposition of the terminals 56–60 as described later.

Figure 11:
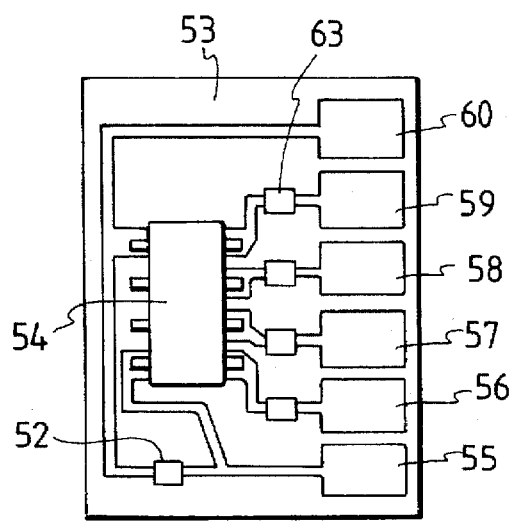

FIG. 11 illustrates an embodiment in which the circuit shown in FIG. 10 is mounted. A predetermined circuit pattern is provided on a printed circuit board 53, and the IC 54 is secured thereon by soldering or the like, and the plurality of resistors 63 and the capacitor 62 are secured by using so-called chip type components. The terminals 55 to 60 are gold plated or the like so as to resist corrosion, since they are intended to provide good electric conduction. According to this embodiment, the IC 54 comprises an IC molded in plastic or the like.

Figure 12A:
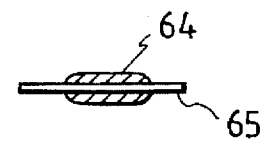
Figure 12B:
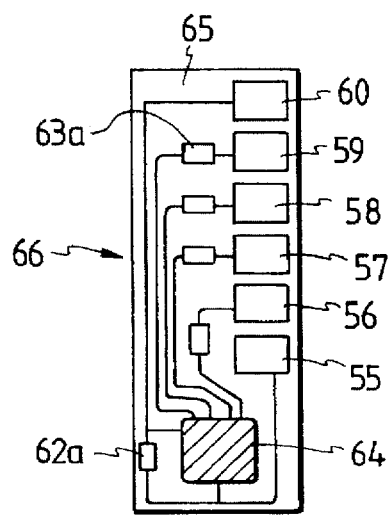

FIGS. 12A and 12B illustrate a structure arranged such that the size of the structure shown in FIG. 11 is further reduced, where a so-called TAB (Tape Automated Bonding) method is employed therein. An IC (omitted from illustration) is directly gang-bonded on the pattern formed on a flexible printed circuit board (abbreviated to "FPC" hereinafter) 65. As shown in the cross-sectional view FIG. 12A, both the top and bottom ends are potting-sealed by resin 64. A plurality of resistors 63a for preventing static electricity are formed by a carbon printing method, and a capacitor 62a also comprises a laminated and small type capacitor.

The assembly formed as described above will be called an IC substrate 66 hereinafter.

Thanks to the arrangement described above, the IC substrate 66 is given a flexibility so that it can be folded or accommodated in small spaces.

The IC substrate 66 acts as the minimum unit for storing information. Furthermore, reading data stored in the IC or storing new data in the IC can be performed by applying power and a digital signal using a predetermined device, to the terminals 55 to 60.

Figure 16:
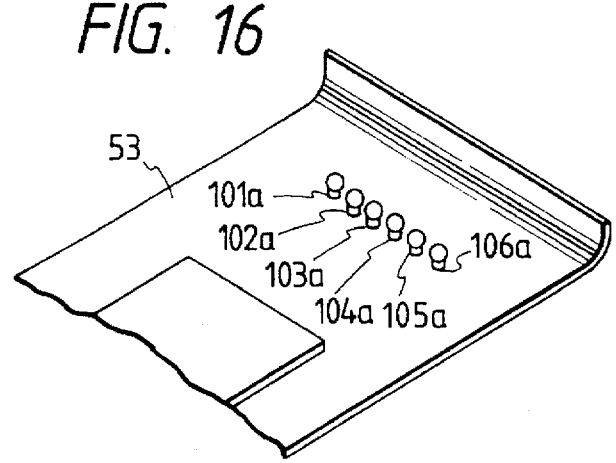
FIG. 16 is a view which illustrates a portion of the structure of the camera according to the second embodiment of the cartridge.
Figure 17:
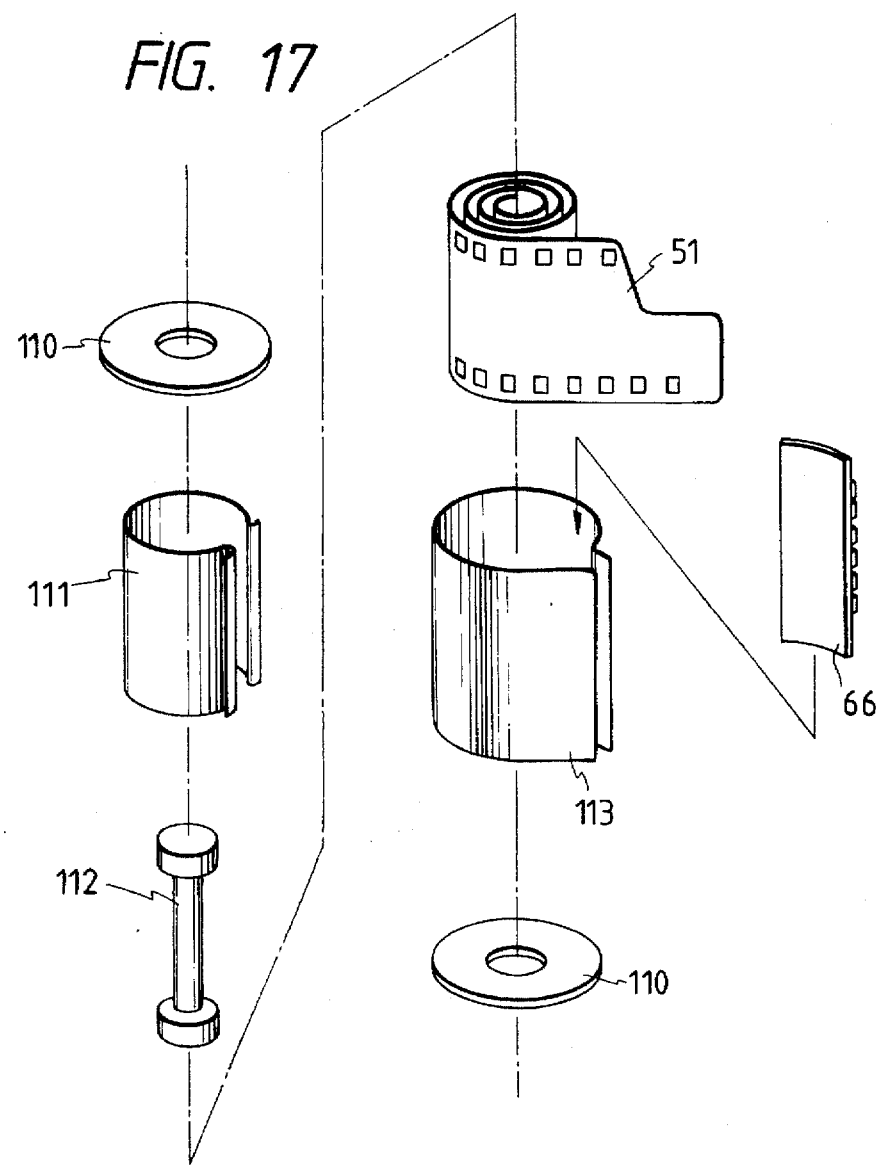
FIG. 17 is an exploded view which illustrates the first and second embodiments of the cartridge.
Figure 18A:
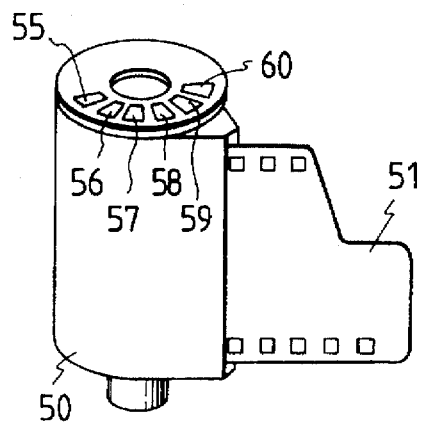
FIGS. 18A, 18B, 18C, and 19 are views which illustrate the structure of a third embodiment of the cartridge according to the present invention.
Figure 18B:
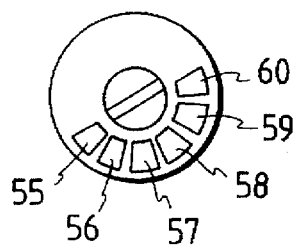

FIG. 13A illustrates the exterior of an embodiment in which the IC substrate 66 shown in FIGS. 10, 11, 12A and 12B is accommodated in a film cartridge 50. The structure is formed such that apertures are formed on the curved surface of the exterior side of the film cartridge 50 as to expose the terminals 55 to 60 of the IC substrate 66 appear. FIG. 13B is a lateral cross-section of FIG. 13A where the IC substrate 66 is accommodated along the circumference of the film cartridge 50. FIG. 14 illustrates a camera 6a in which the film cartridge 50 is loaded. Its structure is so arranged that contacts 101 to 106 in the camera 6a and the terminals 60 to 55 are positioned to contact with each other for the purpose of performing a data communication. FIG. 15A illustrates an embodiment structured similarly to the film cartridge 7 shown in FIGS. 4 and 5. This embodiment can be effectively employed in the case where an IC substrate cannot be bent. FIG. 15B is, similar to FIG. 13B, a lateral cross-section of the film cartridge 50 wherein the IC substrate 66 is accommodated in a relatively flat state. Similarly to FIG. 4, the structure of the camera 6a is arranged such that the terminals are, as shown in FIG. 16, disposed on the inner surface of the rear cover 9 of the camera 6a when the film cartridge 50 is mounted on this camera 6a. The terminals 101a to 106a are brought into contact with the corresponding terminals 60 to 55. FIG. 17 is a view which illustrates the structure of the film cartridge 50 according to the embodiment shown in FIGS. 13A, 13B, and 15. The film cartridge 50 comprises two covers 110, inner cylinder 111, shaft 112, film 51, an outer cylinder 113, and the IC substrate 66 positioned in close contact with the outer cylinder 113. This film cartridge 50 is arranged to be secured by the top and bottom covers 110. Since when either of the covers 110 is removed, the film cartridge 50 can be disassembled as shown in FIG. 17, the detachment of the IC substrate 66 can be readily performed. In addition, thanks to the presence of the inner cylinder 111, the risk of contact between the film 51 and the IC substrate 66 can be eliminated. FIG. 18A illustrates another embodiment, in which an exterior of the structure is formed in a different way from the embodiment shown in FIGS. 13A, 13B, 15A, 15B, and 15C, such that the terminals 55 to 60 are disposed in the cover portion. FIG. 18B is a top plan view of FIG. 18A, and FIG. 18C is a lateral plan view of the IC substrate 66, The substrate 66 is formed in an annular shape so as to fit the shape of the cover 110.

Figure 18C:
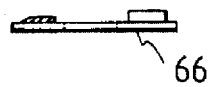
Figure 19:
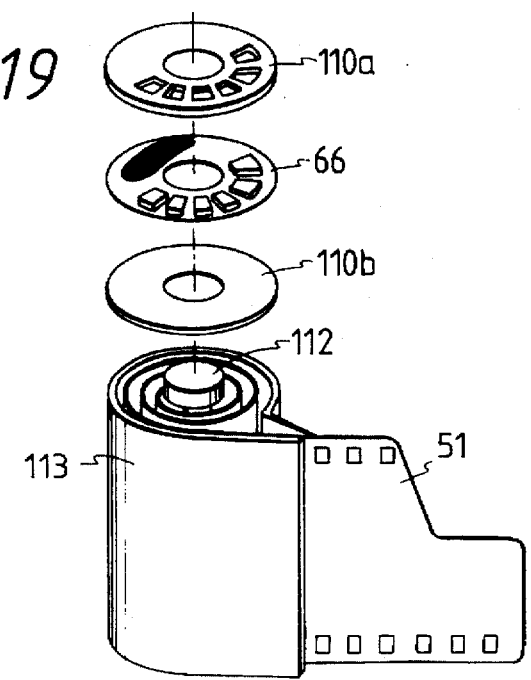

FIG. 19 illustrates the structure of the embodiment shown in FIGS. 18A, 18B, and 18C. Since the basic structure is formed as illustrated in FIG. 17, only the different portions are shown in FIG. 19. In addition to a lower cover 110, the outer cylinder 113, the film 51, and the shaft 112 an intermediate cover 110b, and the IC substrate 66, and a cover 110a having holes for exposing the terminals are provided. In this embodiment, the inner cylinder 111 is not used. According to this embodiment, the IC substrate 66 can be readily inserted or removed by detaching and attaching of the cover 110a.

Although the contacts disposed in the camera are not illustrated for this embodiment, the camera includes terminals at the positions designated by an arrow A or at the positions designated by an arrow B in FIG. 14 depending on the end of the cartridge at which terminals 55–60 are exposed.

Figure 20A:
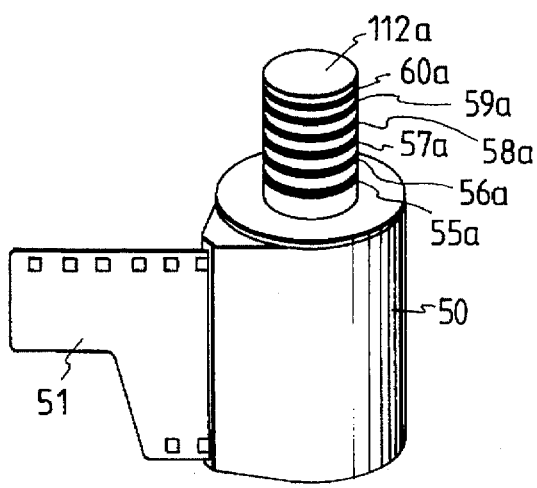
FIGS. 20A, 20B, 20C, and 20D are views which illustrate the structure of a fourth embodiment of the cartridge according to the present invention.
Figure 20B:
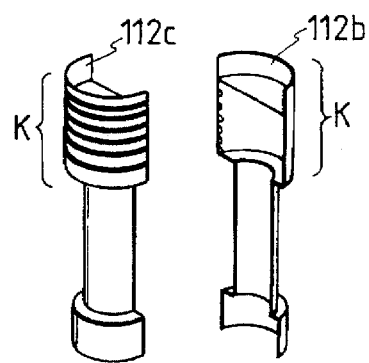
Figure 20C:
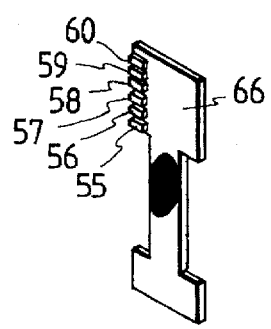

FIGS. 20A, 20B, 20C, and 20D illustrate the exterior of an embodiment in which the IC substrate 66 is disposed in a shaft 112a of the film cartridge 50. FIG. 20B illustrates a state in which the shaft 112a is divided into two pieces in which the IC substrate 66 shown in FIG. 20C is disposed. Symbol K of FIG. 20B designates a member arranged to make contacts on the shaft 112a always engage the contacts on the camera side to be described later when the shaft 112a rotates. The terminals 55 to 60 are arranged to be brought into contact with contact members of the shafts 112b and 112c when the IC substrate 66 is disposed in the shaft 112a, the terminals 55 to 60 being connected to 55a to 60a, respectively. Since other portions of the structure are basically the same as then shown in FIG. 17, then the description thereof is omitted here. The film cartridge 50 formed as shown in FIG. 20A is brought into contact with, for example, contacts 101b to 106b of the camera 6b shown in FIG. 21 so as to exchange data. That is, the contacts 101b to 106b are arranged as to be brought into contact with the shaft 112a when the film cartridge 50 is accommodated in the camera 6b.

Figure 20D:
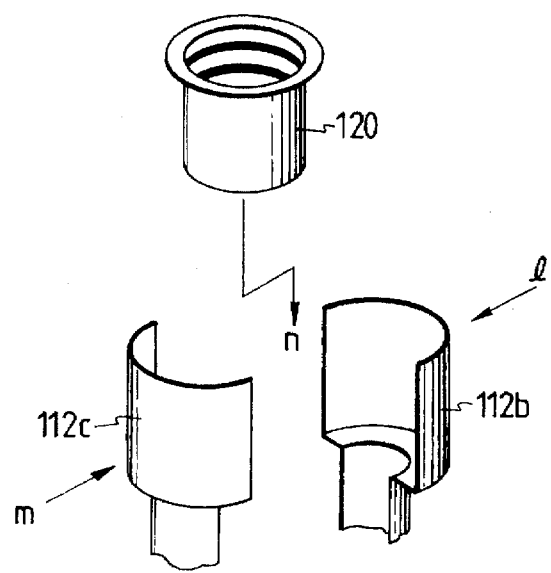
Figure 21:
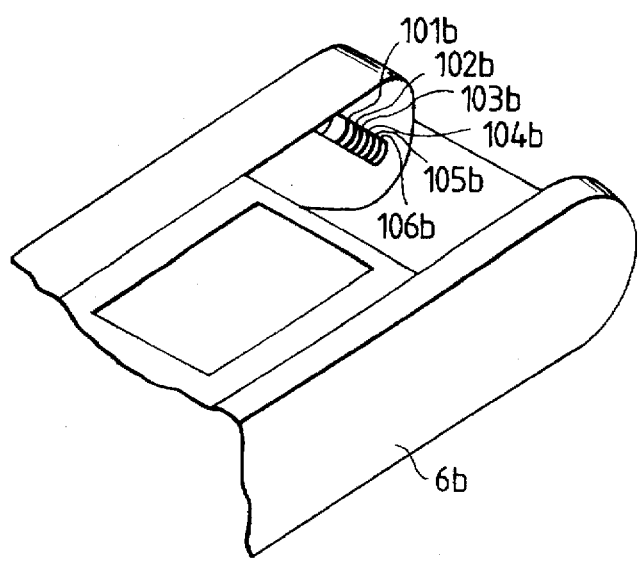
FIG. 21 is a view which illustrates a portion of the structure of the camera according to the fourth embodiment of the cartridge.

Although the portion to be brought into contact with the camera is, as shown FIG. 20B, provided on the outer surface of the shaft 112b, it may be disposed on the inside portion of the shaft, as shown in FIG. 20D. The terminals of the IC substrate and the contacts disposed in the circumferential direction along the inner surface of a shaft cap 120 can be brought into contact with each other by fixing shaft portions 112b and 112c in the corresponding directions designated by arrows 1 and m after the IC substrate 66 (omitted from illustration) has been disposed in the shaft, and by installing the shaft cap 120 in the direction as designated by an arrow n. The manner for bringing this film cartridge into contact with the camera contacts when this film cartridge is accommodated in the camera is evident from FIG. 21. Thus, the description is omitted here.

Although the flexible IC substrate 66 is described with reference to FIGS. 12A and 12B, an embodiment in which an IC card 120 without any flexibility is shown in FIG. 22.

Referring to FIG. 22, the film cartridge 50 and the film 51 employed are the same as the conventional example. However, the IC card 120 is, as designated by an arrow, detachably attached to the side surface of the cartridge 50.

The overall body of the IC card 120 is integrally formed by molding plastic, and an IC chip 121 is enclosed therein as designated by a dashed line. The terminals 55 to 60 are exposed at the side surface of the IC card 120 as a result of insert machining or the like. The connections established between the IC chip 121 and the terminals 55 to 60 and the peripheral components shown in FIG. 10 are omitted from illustration.

Although the function realized by the IC card 120 is the same as the IC substrate shown in FIGS. 12A and 12B, this IC card 120 exhibits easy handling, and excellent durability.

In this case, the plastic molding for forming the IC card may be given a certain degree of electric conduction for the purpose of preventing static electricity. However, since the terminals 55 and 60 are present on the surface of this IC card, the electric conduction realized by the IC card 120 needs to be low, so that electrical leakage between the terminals 55 and 60 can be neglected.

When a user purchases the film, the IC card is secured to the film cartridge 50 so that the user loads the film cartridge with the IC card intact to perform photography.

This state is shown in FIG. 23. The film cartridge 50 equipped with the IC card 120 is loaded between a camera body 122 and the rear cover 53, and a plurality of contacts 101 to 106 projecting from the camera body are abutted against the terminals 55 to 60 on the IC card 120 for the purpose of establishing an electric connection so that data communication can be performed between the circuit (omitted from illustration) in the camera and the IC 121.

When the film 51 is drawn out from the film cartridge 50 to conduct the development and printing on the photographic paper in the processing laboratory after the photography has been completed, reading the information stored on the inside of the IC card 120 which has been removed is simultaneously performed by using a predetermined device.

Then, the film cartridge 50 is discarded, but the IC card 120 is returned to the user with the developed film pieces and the photographic paper prints to be stored.

Since the IC card 120 is arranged to be detachable from the film cartridge 50, it can be used repeatedly. For example if an E$^2$ PROM (Electrical Erasable PROM) is used as the IC 121, electrical writing of information and erasing the same can be freely performed. Therefore, a used IC card 120 can be used again in a film cartridge in which new film has been charged.

FIG. 24 illustrates another embodiment. A film cartridge 124 is formed in a completely different manner from the conventional one square type being exemplified here. One side wall of the film cartridge 124 can be, as illustrated, attached and detached, and this side wall serves as an IC card 129. a light-tight box is formed as a result of fitting of the projections 127 and 128 of the IC card 129 within the recesses 125 and 126 formed in the film cartridge 124. The film 51 is, of course, wound to the shaft as in the conventional manner.

Since the relationship with the camera at the time of photography is the same as that shown in FIG. 23, a description is omitted.

After the photography has been completed, the IC card 129 is slid and from the film cartridge 124 for processing, is shown in FIG. 24. The structures of the terminals provided on the IC card 129 and the IC 121 are the same as those of the IC card 120. An advantage obtained from the IC card 129 is that the case for forming the film cartridge 124 serves as the case for accommodating the IC 121 so that a significant advantage in terms of cost and space can be obtained.

Although in FIG. 24 the IC card is slid from a square cartridge, the present invention is not limited to this. For example, an IC card fitted in a cylindrical cartridge with assistance of the elasticity of plastic thereof may be employed.

FIG. 25 illustrates a block diagram of a circuit used in a camera in which both a conventional type film cartridge 300 and a film cartridge 124 according to the present invention can be used. As is known, the conventional type film cartridge 300 is provided with the ISO sensitivity and the number of frames as the DX code, and it, of course, cannot perform the data communication as in the embodiments according to the present invention. Although the film cartridge 124 can perform the data communication, it can not output static codes such as the DX code.

Signal lines from the camera side contacts 101 to 106 as shown in FIG. 23 are connected to a CPU 131 via an interface circuit 130.

The operation will now be described.

Figure 26:
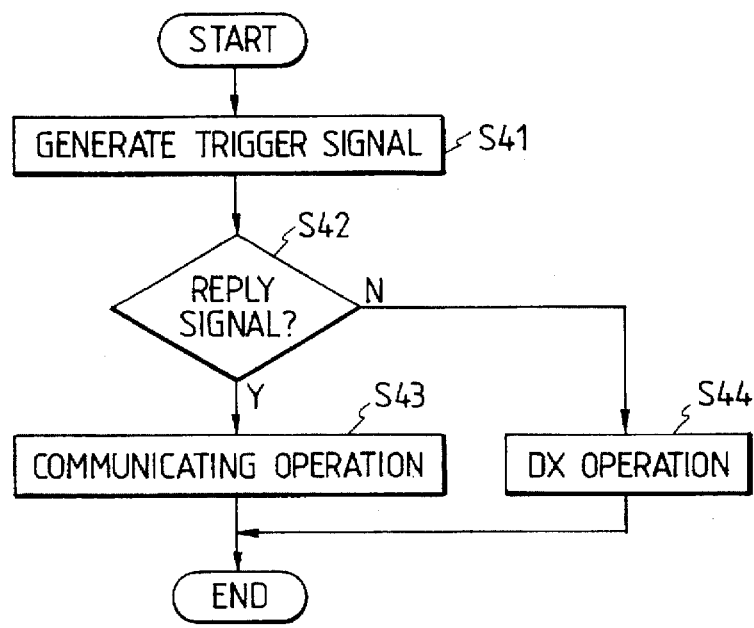
FIG. 26 is a flow chart which illustrates a part of the operation of the camera shown in FIG. 25.

First, in a case where the conventional film cartridge 300 is used, the CPU 131 acts to identify the loaded film via the interface circuit 130. This identification process is performed such that a trigger signal is, in step S41 shown in the flow chart FIG. 26, first transmitted via a hand-shake terminal, and in step S42, it is determined whether or not the film cartridge can perform the data communication, on the basis of whether or not a reply signal is returned. In this case, no reply signal is received after the trigger signal has been transmitted. Therefore, the CPU 131 forwards into known routine for detecting the DX code in step S44 after it has confirmed the fact of no reply signal.

In the case where the film cartridge 124 is loaded, since the reply signal is generated after the generation of the trigger signal, the data communication with the information signal is performed in step S43.

Figure 27A:
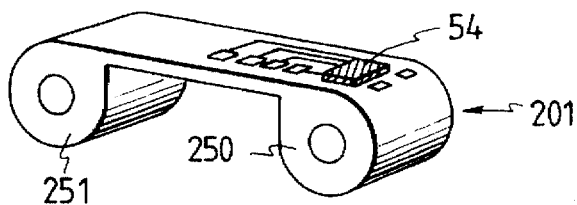
FIGS. 27A, 27B, and 27C are views which illustrate the structure of a seventh embodiment of the cartridge according to the present invention and the structure of the camera according to the same.

FIG. 27A illustrates a state where the IC 54 and its peripheral components are mounted on a cassette type film cartridge 201 having film accommodating portions 250 and 251 on the two sides thereof. Although the IC 54 and its peripheral components are disposed outside the cartridge 201 according to this embodiment, the structure may, of course, be arranged such that the cartridge 201 is formed in two layers so as to dispose the above-described components therebetween. The details of such structure have been described with reference to FIGS. 12A, 12B, and 22 and so on.

Figure 27C:
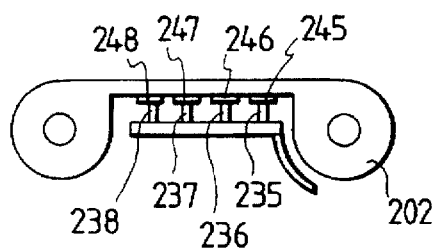
Figure 27B:
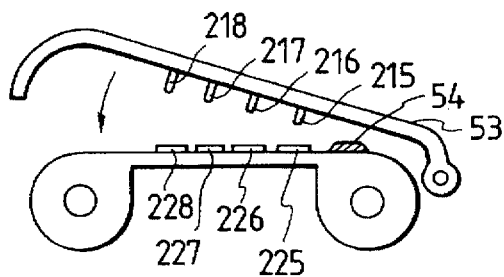

FIG. 27B illustrates how an electric connection can be established between the contacts 225 to 228 provided on a surface of cartridge 201 confronting contacts 215 to 218 on the rear cover 53 of the camera when the rear cover 53 is closed. FIG. 27C illustrates an embodiment in which an electric connection can be established between the terminals 245 to 248 which are provided, as illustrated, on the inner surface of the cartridge and contacts 235 to 238 in the camera when the cartridge 202 is loaded in the camera.

Although the number of the conjunction contact surfaces is four in the embodiments shown in FIGS. 27A, 27B, and 27C for the purpose of making the description simple, it may, of course, be six as shown in FIGS. 11, 12A and 12B, or more.

Since the film cartridges 201 and 202 have relatively great flat portions, the portions for accommodating the circuit components including the IC 54 and the positions at which the terminals 225 to 228 and 245 to 248 can be relatively freely determined.

According to the structure described above, the data stored in the IC mounted on a portion of the film cartridge and the film need to correspond to each other. The way in which this may be attained will now be described.

Figure 28A:
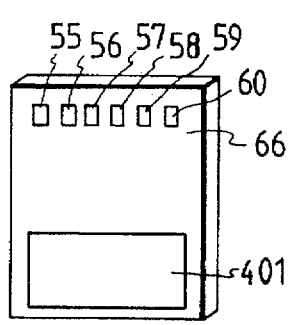
FIGS. 28A and 28B are views which illustrate the relationship between an IC substrate and a film according to the present invention.
Figure 28B:
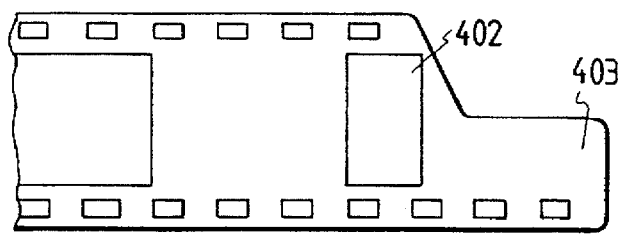

The embodiment shown in FIGS. 28A and 28B is characterized in that a space for a note is provided on both the substrate 66 and a film 403. Referring to FIG. 28A, reference numeral 401 represents a space for a note provided on the substrate 66. Referring to FIG. 28B, the film 403. According to this embodiment, the user taking a picture can write in the space for a note. The size of the space and the position at which this space for writing a note is disposed may, of course, be freely determined so far as the space on the film allows, and a plurality of spaces for notes may be provided.

Figure 29:
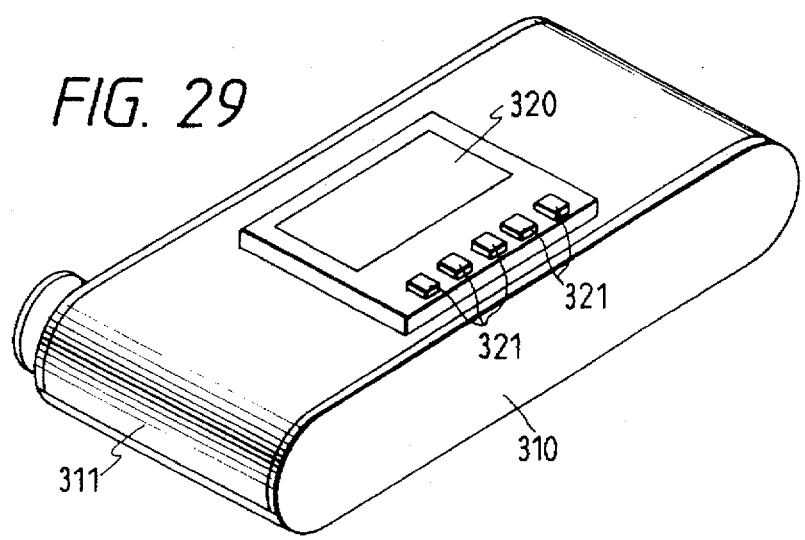
FIG. 29 is a view which illustrates a data pack of the camera according to the present invention.

FIG. 29 illustrates another embodiment in which an electric data writing device is provided on the rear cover 311 of the camera 310. Referring to FIG. 29, reference numeral 320 represents a display panel of the data writing device, this display panel being formed by, for example, liquid crystals. Reference numeral 321 represents input keys for inputting various types of data. A user loads, for example, the film cartridge in the camera 310, and inputs an identification number or the like through the input keys 321 with confirmation performed with reference to the contents on the display panel before starting photography. The camera 310 is arranged to be capable of recording such identification number on the film, for example, optically, while recording the same on the substrate electrically.

Figure 30A:
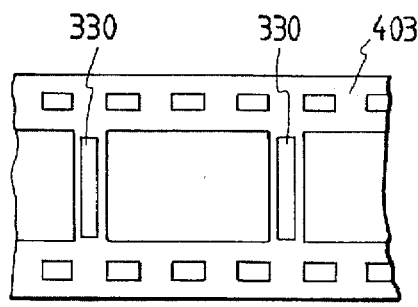
FIGS. 30A, 30B, 31A, 31B and 32 are views which illustrate the film recording method according to the present invention.
Figure 30B:
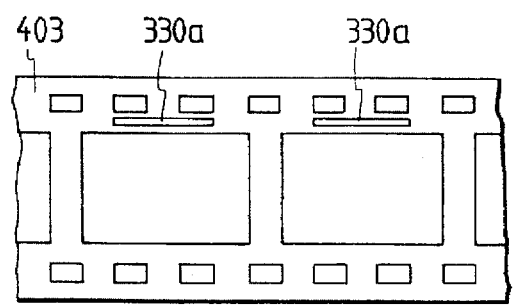

FIGS. 30A and 30B illustrates alternative positions of identification numbers which have been optically added. Referring to FIG. 30A, an optical identification number 330 is added between shots of the film 403. Referring to FIG. 30B, the identification numbers 330a are added above and/or below each of the shots of the film 403 in parallel to the film feeding direction.

Figure 31A:
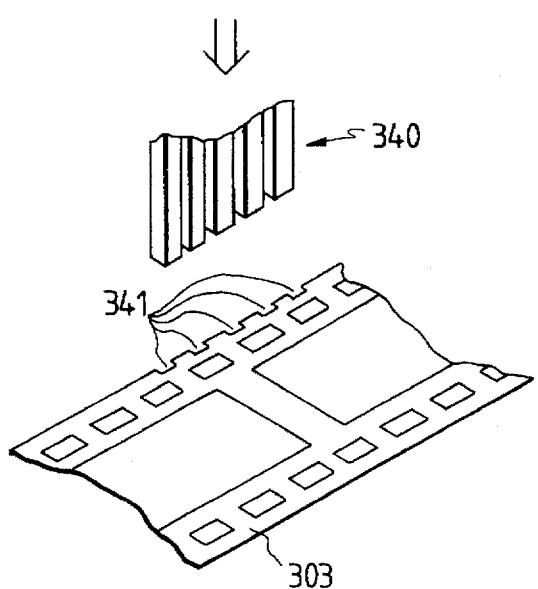
Figure 31B:
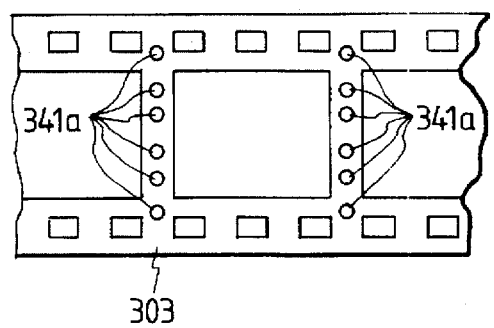

FIGS. 31A and 31B illustrate embodiments in which cuts or holes are formed in part of the film. Referring to FIG. 31A, holes 341 are formed in part of the side surface of the film 403, while referring to FIG. 31B, holes 341a are formed in the intermediate portions of the film 403. Referring to FIG. 31A, reference numeral 340 represents a portion of a device for forming cuts or holes. Such cuts or holes are formed in accordance with the identification numbers at, for example, the processing laboratory.

Figure 32:
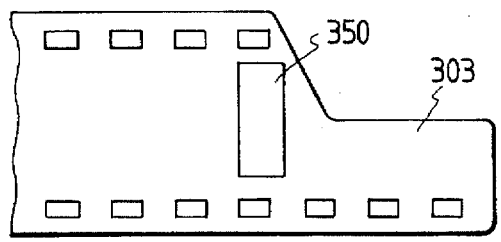

FIG. 32 illustrates an embodiment in which the film 403 is identified at, for example, the processing laboratory on the basis of a seal 350 in which the identification number is written.

In addition, the following methods can be employed: a method in which the identification numbers which have been previously stored in the substrate 66 are added at the processing laboratory before the development is performed; a method in which the identification numbers is mechanically written; a method in which a plurality of the above-described methods are combined.

Now, an embodiment will be described, for a case where there is manual set data to be manually determined through a keyboard and auto set data to be automatically determined by an automatic measuring device such as a counter, as the data to be stored in a ROM of a film cartridge.

In this description, the "auto set data" is to be automatically stored for every frame, while the "manual set data" is to be stored in the ROM of the film cartridge only when set through the keyboard. The operation of this embodiment is shown in a flow chart of FIG. 33.

Figure 33:
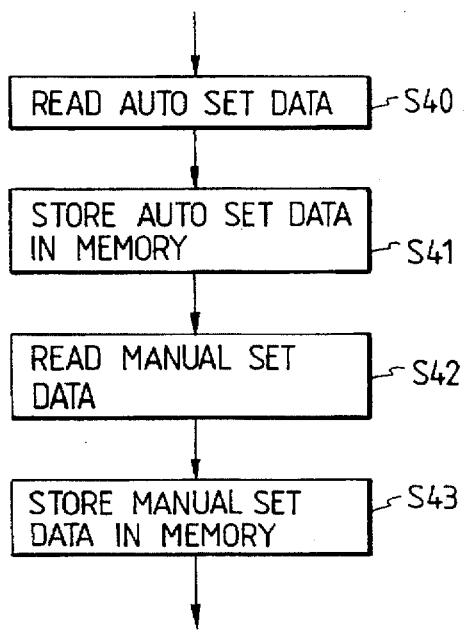
FIGS. 33 and 34 are flow charts which illustrate a portion of the steps shown in FIG. 1A.

The flow chart shown in FIG. 33 is arranged such that step S26 or step S27 of FIG. 1C between step S25 and step S28 is replaced, or step S30 of FIG. 1D between step S23 and step S31 is replaced. In step S40, auto set data is read. This auto set data is exemplified by: the BV value, AV value, TV value, date, time elapsed, lens information such as the magnification of the lens, and trimming information. The BV value, AV value, and TV value are processed by the CPU 301 (FIG. 4B) on the basis of the output from the photometer 303 while the date, and the time elapse are read by the CPU 301 from a timer 306. In step S41, the auto set data is stored in the ROM of the film cartridge via the terminals 9. In step S42, the manual data set by the keyboard is read. This manual set data is exemplified by: the name and the identification No. of the specimen, the type of treatment performed for the purpose of preparation of the specimen, and the number of the prints. In step S43, the manual set data is stored in the ROM of the film cartridge via the terminals 9.

Figure 34:
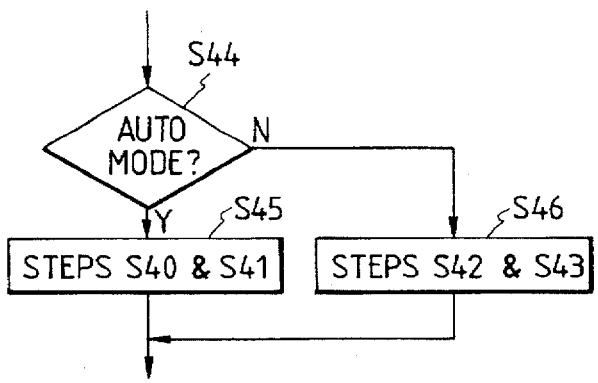

FIG. 34 illustrates an embodiment of a flow chart in which either the auto mode for storing the auto set data or manual mode for storing the manual set data is selected by a switch means. Similarly to the flow chart shown in FIG. 33, step S26 or step S27 between step S25 and step S28 of FIG. 1C is replaced, or step S30 between step S23 and step S31 of FIG. 1D is replaced. In step S44, it is determined whether or not the auto mode is set by the switch means. If it is the auto mode, the process shifts to step S45 in which the same operation as in step S40 and step S41 is performed. If it is not the auto mode, the same operation as the manual mode as in step S42 and step S43 is performed in step S46.

I claim:

1. A camera comprising:

loading means for loading a film cartridge therein, said film cartridge including a film, electric memory means, and a plurality of electric contacts which are electrically connected to said memory means;

terminal means including a plurality of terminals to be electrically connected to said plurality of electric contacts of said film cartridge loaded in said loading means;

exposure means for exposing said film to light;

processing means for processing exposure data relating to the exposure of said film;

store means for storing said exposure data in said memory means via said terminal means;

detection means for detecting that another film cartridge, having no electric memory means, has been loaded in said loading means; and means responsive to said detection means for prohibiting said store means from operating.

2. A camera according to claim 1, wherein said store means stores said exposure data in said memory means whenever one frame of said film is exposed.

3. A camera according to claim 1, wherein said store means stores data which is different from said exposure data in said memory means via said terminal means in response to the loading of the first mentioned film cartridge in said loading means.

4. A camera according to claim 1 further comprising means for recording identification data in said film corresponding to said exposure data.

5. A camera according to claim 1, wherein said store means stores camera-related data in said memory means in response to the loading of the first-mentioned film cartridge in said loading means.

6. A film cartridge comprising:

film;

a semiconductor device capable of writing, erasing and reading data;

a plurality of terminals;

connection means for electrically connecting said plurality of terminals and said semiconductor device; and an accommodating portion in which said film, said semiconductor device, said plurality of terminals, and said connection means are accommodated, said accommodating portion being provided with a plurality of openings each of which corresponds to said plurality of terminals for the purpose of having said plurality of terminals electrically connected to a camera when said film cartridge is loaded in said camera.

7. A film cartridge comprising:

a film;

a semiconductor device capable of writing, erasing, and reading data;

a plurality of terminals;

connection means for electrically connecting said plurality of terminals and said semiconductor device, said plurality of terminals being arranged to be electrically connected to a camera when said film cartridge is loaded in said camera, and said plurality of terminals and said connection means being integrally provided with said semiconductor device; and an accommodating portion in which said film is accommodated, said semiconductor device being detachably accommodated by said accommodating portion.

8. A film cartridge according to claim 7, wherein said accommodating portion is provided with openings which are closed by said semiconductor device when said semiconductor device is accommodated by said accommodating portion.

9. A film cartridge comprising:

a film;

a semiconductor device capable of writing, erasing, and reading data;

a plurality of terminals;

connection means for electrically connecting said plurality of terminals and said semiconductor device, said plurality of terminals being arranged to be electrically connected to a camera when said film cartridge is loaded in said camera;

a first member in which data is written, said first member being provided in said film; and a second member in which data is written, said second member being provided in said semiconductor device.

10. A film cartridge according to claim 9, wherein data corresponding to data written in said first member is written in said second member.

11. A camera comprising:

loading means in which a film cartridge is loaded, said film cartridge including a film, electric memory means, and a plurality of electric contacts which are electrically connected to said memory means;

terminal means including a plurality of terminals to be electrically connected to said plurality of electric contacts of said film cartridge loaded in said loading means;

exposure means for exposing said film to light;

processing means for automatically processing auto set data relating to the exposure of said film;

operation means operated manually for processing manual set data relating to said exposure of said film but different from said auto set data; and store means having a first mode for storing said auto set data in said memory means via said terminal means and a second mode for storing said manual set data in said memory means via said terminal means, said store means being operated selectively in either said first mode or said second mode.

12. A camera according to claim 11, wherein said store means does not store said manual set data in said memory means when the mode is said first mode, and does not store said auto set data in said memory means when the mode is said second mode.

13. A camera according to claim 12, wherein said store means stores data in said memory means whenever one frame of said film is exposed with said exposure means.

14. A camera according to claim 13, wherein said auto set data includes information relating to at least one of a diaphragm of a lens, a shutter speed value, and a subject brightness.

15. A camera comprising:
loading means for loading a film cartridge therein, said film cartridge including a film and memory means;
exposure means for exposing said film to light;
processing means for processing exposure data relating to the exposure of said film;
store means for storing said exposure data in said memory means;
detection means for detecting that another film cartridge, having no memory means, has been loaded in said loading means; and
means responsive to said detection means for prohibiting said store means from operating.

16. A camera according to claim 15, wherein said store means stores said exposure data in said memory means whenever one frame of said film is exposed.

17. A camera comprising:
loading means in which a film cartridge is loaded, said film cartridge including a film and memory means;
exposure means for exposing said film to light;
processing means for automatically processing auto set data relating to the exposure of said film;
operation means operated manually for processing manual set data relating to said exposure of said film but different from said auto set data; and
store means having a first mode for storing said auto set data in said memory means and a second mode for storing said manual set data in said memory means, said store means being operated selectively in either said first mode or said second mode.

18. A camera system comprising:
a) a camera having
loading means for loading therein a film cartridge including a film and memory means,
exposure means for exposing said film to light,
processing means for processing exposure data relating to the exposure of said film, and
store means for storing said exposure data in said memory means whenever one frame of said film is exposed; and
b) a writing apparatus having producing means for producing data independently of said camera and transferring the produced data to said memory means.

19. A camera system according to claim 18, wherein said writing apparatus has display means for displaying data stored in said memory means.

20. A camera system according to claim 19, which further comprises a developing apparatus for developing said film on the basis of data stored in said memory means.

21. A camera system according to claim 20, which further comprises a printing apparatus responsive to data stored in said memory means for printing images exposed on said film.

22. An information processing apparatus comprising:
a loading part in which a film cartridge is loaded, said film cartridge including a film and memory;

an exposure part to perform an exposure operation repeatedly, said exposure part exposing a respective frame of said film to light and winding up said frame in each exposure operation;
a producing part which produces in association with each exposure operation a set of data corresponding to the frame which is exposed in that exposure operation; and
a storing part which collectively stores in said memory sets of data from said producing part without deleting the sets of data corresponding to previously exposed frames from said memory, said storing part operating with each exposure operation to store the set of data corresponding to the exposed frame into the memory such that the sets of data have a one-to-one correspondence with the exposed frames;
a detecting part which detects a condition wherein one-to-one correspondence between sets of data produced by said producing part and exposed frames of said film will not be retained; and
a warning part which performs a warning in response to detection of said condition by said detecting part.

23. An information processing apparatus according to claim 22, wherein said producing part includes a setting part to set data to be produced, and said condition is a condition in which an operation is attempted to set data for a subsequent frame of said film prior to exposure of a current frame of said film.

24. An information processing apparatus according to claim 22, wherein said producing part includes a setting part to set data to be produced, and said condition is a condition in which an exposure operation is attempted for a current frame of said film without prior operation of said setting part in association with that frame.

25. An information processing apparatus comprising:
a loading part in which a film cartridge is loaded, said film cartridge including a film and a memory;
an exposure part to perform an exposure operation repeatedly, said exposure part exposing a respective frame of said film to light and winding up said frame in each exposure operation;
a producing part which produces a respective set of data to be stored in said memory when each frame of said film is exposed; and
a warning part which detects a condition wherein a one-to-one correspondence between sets of data produced by said producing part and exposed frames of said film will not be retained, and which prohibits the exposure operation in response to detection of said condition.

26. An information processing apparatus according to claim 25, wherein said producing part includes a setting part to set data to be produced, and said condition is a condition in which an exposure operation is attempted for a current frame of said film without prior operation of said setting part in association with that frame.

27. An information processing apparatus comprising:
a loading part in which a film cartridge is loaded, said film cartridge including a film and a memory;
an exposure part to perform an exposure operation repeatedly, said exposure part exposing a respective frame of said film to light and winding up said frame in each exposure operation;
a producing part which automatically produces, for each exposure operation, auto set data relating to that exposure operation;

an operation part operated manually for inputting, for each exposure operation, at least one individual item of manual set data relating to that exposure operation but different from all auto set data for that exposure operation; and a storing part to collectively store in said memory the auto set data and manual set data for every exposed frame of said film.

28. An information processing apparatus comprising:

a loading part in which a film cartridge is loaded, said film cartridge including a film and a memory;

an exposure part capable of repeatedly performing an exposure operation to expose said film to light;

a producing part which produces data for each exposure operation and stores said data in said memory with each exposure operation;

a holding part independent of said memory and which holds the data produced by said producing part for each exposure operation until the next exposure operation; and a change inputting part to input changes to be made, prior to the next exposure operation, from the data held by said holding part;

said producing part producing, for the next exposure operation, the data held by said holding part modified by the changes input by said change inputting part.

29. An information processing apparatus according to claim 28, further comprising a display for displaying said data held by said holding part.

30. An information processing system comprising:

a loading part in which a film cartridge is loaded, said film cartridge including a film and a memory;

an exposure part to perform an exposure operation to expose said film to light;

a producing part which produces data and stores said data in said memory whenever one frame of said film is exposed by said exposure part;

an operation part to be operated by an operator; and a modifying part independent of said producing part and responsive to said operation part for modifying said data stored in said memory by said producing part.

31. An information processing apparatus according to claim 30, wherein said modifying part includes a converter unit connectable to communicate electronically with said memory part when said film cartridge is not loaded in said loading part.

32. A recording method for a camera capable of loading therein a film cartridge which includes a film and a memory part, comprising:

performing an exposure operation repeatedly;

producing, in association with each exposure operation, a set of data corresponding to the frame which is exposed in that exposure operation;

with each exposure operation, storing in said memory part of said film cartridge the set of data corresponding to that exposure operation, while retaining in said memory part sets of data which have been stored from previous exposure operations;

detecting a condition wherein one-to-one correspondence between sets of data produced by said producing part and exposed frames of said film will not be retained; and performing a warning in response to detection of said condition.

33. A recording method for an information processing apparatus which is capable of loading therein a film cartridge, having a film and a memory part, and which includes a producing part to produce a respective set of data to be stored in the memory part of the film cartridge when a frame of the film is exposed to light in an exposure operation, said method comprising:

detecting a condition in which one-to-one correspondence between sets of data produced by said producing part and exposed frames of the film will not be retained; and in response to detection of said condition, prohibiting, by an automatic operation of said apparatus independent of a user of said apparatus, subsequent performance of the exposure operation.

34. A method according to claim 33, wherein the producing part of said apparatus includes a setting part to set data to be produced, and said condition is a condition in which an exposure operation is attempted for a current frame of the film without prior operation of the setting part in association with that frame.

35. A recording method for an information processing apparatus capable of loading therein a film cartridge which includes a film and a memory part, comprising:

performing an exposure operation repeatedly, each exposure operation exposing a respective frame of the film to light;

automatically producing, for each exposure operation, auto set data relating to that exposure operation;

manually inputting, for each exposure operation, at least one individual item of manual set data relating to that exposure operation but different from all auto set data for that exposure operation; and collectively storing, in said memory part of said film cartridge, the auto set data and manual set data for every exposed frame of said film.

36. A recording method for an information processing apparatus capable of loading therein a film cartridge which includes a film and a memory part, comprising:

performing an exposure operation repeatedly, each exposure operation exposing a respective frame of the film to light;

producing respective data for each exposure operation and storing the data in said memory part of said film cartridge with each exposure operation;

holding, independently of said memory part, the data produced for each exposure operation until the next exposure operation;

inputting changes to be made from the held data of a given exposure operation; and producing, for the next exposure operation, the held data modified by the inputted changes.

37. A recording method for an information processing apparatus capable of loading therein a film cartridge which includes a film and a memory part, comprising:

performing an exposure operation, the exposure operation exposing a frame of the film to light;

operating a producing part to produce and store data in said memory part of said film cartridge whenever one frame of the film is exposed; and operating a modifying part independent of said producing part to modify the data stored in said memory part, in response to operation of an operation member by an operator.

38. An information processing apparatus comprising:

a loading part in which a film cartridge is loaded, said film cartridge including a film, an electric memory, and a plurality of electric contacts which are electrically connected to said memory;

a terminal part including a plurality of terminals to be electrically connected to said plurality of electric contacts of said film cartridge loaded in said loading part;

an exposure part which exposes said film to light;

a processing part which processes exposure data relating to the exposure of said film;

a storing part which stores said exposure data in said memory by way of said terminals;

a detector which detects that another cartridge, having no electric memory, has been loaded in said loading part; and an inhibiting part responsive to said detector to inhibit an operation of said storing part.

39. An information processing apparatus comprising:

a loading part in which a film cartridge is loaded, said film cartridge including a film, an electric memory, and a plurality of electric contacts which are electrically connected to said memory;

a terminal part including a plurality of terminals to be electrically connected to said plurality of electric contacts of said film cartridge loaded in said loading part;

an exposure part which exposes said film to light;

a processing part which automatically processes auto set data relating to the exposure of said film;

an operation part operated manually to process manual set data relating to said exposure of said film but different from said auto set data; and a storing part having a first mode to store said auto set data in said memory via said terminals and a second mode to store said manual set data in said memory via said terminals, said storing part being operated selectively in either said first mode or said second mode.

40. An information processing apparatus comprising:

a loading part in which a film cartridge is loaded, said film cartridge including a film and a memory;

an exposure part which exposes said film to light;

a processing part which processes exposure data relating to the exposure of said film;

a storing part to store said exposure data in said memory;

a detector which detects that another film cartridge, having no memory, has been loaded in said loading part; and a prohibition part responsive to said detector to prohibit said storing part from operating.

41. An information processing apparatus comprising:

a loading part in which a film cartridge is loaded, said film cartridge including a film and a memory;

an exposure part which exposes said film to light;

a processing part which automatically processes auto set data relating to the exposure of said film;

an operation part manually operated to process manual set data relating to the exposure of said film but different from said auto set data; and a storing part having a first mode to store said auto set data in said memory and a second mode to store said manual set data in said memory, said storing part being operated selectively in either said first mode or said second mode.

42. An information processing system comprising:

a) an information processing apparatus including
a loading part in which a film cartridge is loaded, said film cartridge including a film and a memory,
an exposure part which exposes said film to light,
a processing part which processes exposure data relating to the exposure of said film, and a storing part to store said exposure data in said memory whenever one frame of said film is exposed; and b) a recording apparatus including
a producing part which produces data independently of said information processing apparatus and transfers the produced data to said memory.

\* \* \* \* \*